(12) United States Patent
Parris et al.

(10) Patent No.: US 8,103,141 B2
(45) Date of Patent: Jan. 24, 2012

(54) COUPLING ELEMENT FOR OPTICAL FIBER CABLES

(75) Inventors: Don Parris, Newton, NC (US); Greg DeChristopher, Hickory, NC (US); Justin Elisha Quinn, Newton, NC (US); Boyce Lookadoo, Hickory, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 12/785,830

(22) Filed: May 24, 2010

(65) Prior Publication Data

US 2010/0232753 A1 Sep. 16, 2010

Related U.S. Application Data

(63) Continuation of application No. 12/146,588, filed on Jun. 26, 2008, now Pat. No. 7,724,998.

(60) Provisional application No. 60/946,754, filed on Jun. 28, 2007.

(51) Int. Cl.
*G02B 6/44* (2006.01)

(52) U.S. Cl. ...................................... 385/100

(58) Field of Classification Search ........... 385/100–114
See application file for complete search history.

(56) References Cited

U.S. PATENT DOCUMENTS

| | | | |
|---|---|---|---|
| 3,879,575 A | 4/1975 | Dobbin et al. | |
| 4,201,607 A | 5/1980 | Rautenberg et al. | |
| 4,332,655 A | 6/1982 | Berejka | |
| 4,382,005 A * | 5/1983 | Miller | 508/221 |
| 4,464,013 A | 8/1984 | Sabia | |
| 4,497,538 A | 2/1985 | Patel | |
| 4,593,442 A | 6/1986 | Wright et al. | |
| 4,701,016 A * | 10/1987 | Gartside et al. | 385/100 |
| 4,709,982 A | 12/1987 | Corne et al. | |
| 4,818,060 A | 4/1989 | Arroyo | |
| 4,852,965 A * | 8/1989 | Mullin et al. | 385/101 |
| 4,859,024 A | 8/1989 | Rahman | |
| 4,943,383 A * | 7/1990 | Avery et al. | 508/304 |
| 5,050,959 A * | 9/1991 | Randisi | 385/100 |
| 5,177,809 A | 1/1993 | Zeidler | |
| 5,285,008 A | 2/1994 | Sas-Jaworsky et al. | |
| 5,358,664 A * | 10/1994 | Brauer | 516/109 |
| 5,621,842 A | 4/1997 | Keller | |
| 6,108,473 A | 8/2000 | Beland et al. | |
| 6,151,434 A * | 11/2000 | Bonicel | 385/102 |
| 6,226,431 B1 | 5/2001 | Brown et al. | |
| 6,229,944 B1 | 5/2001 | Yokokawa et al. | |
| 6,278,826 B1 | 8/2001 | Sheu | |
| 6,295,401 B1 | 9/2001 | Rutterman et al. | |
| 6,374,023 B1 | 4/2002 | Parris | |
| 6,463,199 B1 | 10/2002 | Quinn et al. | |
| 6,475,963 B1 * | 11/2002 | Bloch et al. | 508/467 |
| 6,529,662 B1 | 3/2003 | Kobayashi et al. | |

(Continued)

OTHER PUBLICATIONS

Commonly owned U.S. Appl. No. 60/946,754, filed Jun. 28, 2007.

(Continued)

*Primary Examiner* — Charlie Peng
(74) *Attorney, Agent, or Firm* — Summa, Additon & Ashe, P.A.

(57) ABSTRACT

The present invention relates to a novel coupling composition that is used within optical fiber cables to protect optical fibers and to couple the optical fibers and the surrounding buffer tube casing. The present invention also relates to optical fiber cables that use the novel coupling composition.

26 Claims, 19 Drawing Sheets

U.S. PATENT DOCUMENTS

| | | |
|---|---|---|
| 6,654,525 B2 | 11/2003 | Nechitailo et al. |
| 6,744,955 B2 | 6/2004 | Nechitailo et al. |
| 6,748,146 B2 | 6/2004 | Parris |
| 6,749,446 B2 | 6/2004 | Nechitailo |
| 6,778,745 B2 | 8/2004 | Debban, Jr. et al. |
| 6,970,629 B2 | 11/2005 | Lail et al. |
| 7,006,740 B1 | 2/2006 | Parris |
| 7,024,081 B2 | 4/2006 | Dowd et al. |
| 7,254,303 B2 | 8/2007 | Parsons |
| 7,639,915 B2 | 12/2009 | Parris et al. |
| 7,646,952 B2 | 1/2010 | Parris |
| 2003/0086665 A1 | 5/2003 | Nechitailo et al. |
| 2004/0120666 A1 | 6/2004 | Chalk et al. |
| 2004/0208462 A1 | 10/2004 | Parsons et al. |
| 2004/0213529 A1 | 10/2004 | Dowd et al. |
| 2005/0213902 A1 | 9/2005 | Parsons |
| 2008/0279514 A1* | 11/2008 | Kundis et al. .................. 385/113 |
| 2009/0003785 A1 | 1/2009 | Parris et al. |
| 2010/0098388 A1 | 4/2010 | Parris et al. |

OTHER PUBLICATIONS

U.S. Appl. No. 60/946,744, filed Jun. 28, 2007.
Commonly owned U.S. Appl. No. 60/946,752, filed Jun. 28, 2007.
Kraton, Typical Properties Guide, copyright 2006, downloaded from the web on Mar. 26, 2007.

* cited by examiner

COUPLING ELEMENT FOR OPTICAL FIBER CABLES

CROSS-REFERENCE TO PRIORITY APPLICATIONS

This application is a continuation of commonly assigned U.S. application Ser. No. 12/146,588 for Coupling Composition for Optical Fiber Cables, filed Jun. 26, 2008, (and published Jan. 1, 2009, as Publication No. 2009/0003785 A1), now U.S. Pat. No. 7,724,998.

Parent U.S. patent application Ser. No. 12/146,588 further claims the benefit of U.S. Provisional Patent Application Ser. No. 60/946,754, for Coupling Composition for Optical Fiber Cables (filed Jun. 28, 2007).

Each of the foregoing patent application publications and patent applications is hereby incorporated by reference in its entirety.

FIELD OF THE INVENTION

The invention relates to coupling compositions that are useful in dry optical fiber cables.

BACKGROUND

Optical fiber cables are used to transmit information including telephone signals, television signals, data signals, and Internet communication. To preserve the integrity of the signal transported by optical fiber cables, certain design factors warrant consideration.

First, forces may develop on the optical fibers due to contact with rough, hard, or uneven surfaces within the optical fiber cables. Such contact, for example, may result from thermal cable expansion or contraction, which can cause microbending and macrobending effects. This, in turn, can lead to signal attenuation or signal loss. Layers of protective coatings and claddings around the optical fibers can help to reduce the forces that cause these unwanted effects.

Second, the optical fibers are typically coupled to the surrounding buffer tube in some way. This coupling prevents the optical fibers from pulling back inside the buffer tube as a result of processing, installation, handling, or thermally induced dimensional changes. Not only can these effects hamper accessibility to the fibers during connection operations (e.g., splicing), but also insufficient coupling can lead to excess and/or unevenly distributed optical fiber length (e.g., optical fibers accumulating in a confined space). Such accumulation may cause bending or otherwise force contact between the optical fibers and other cable elements, which can likewise lead to microbending and macrobending.

Third, optical fiber cables are typically used with electronic devices. If water intruding into the cables can spread (e.g., flow) along the length of the cables to these electronic devices, severe damage to the electronic systems may result. It is also thought that the formation of ice within an optical fiber cable can impose onto the optical fibers localized microbending-inducing forces or macrobending-inducing forces. Fillers and water-blocking layers within the cables can impede the movement of water within the cables and thereby limit such damage.

The undesirable effects of signal loss, coupling failure, and water damage can be reduced through the use of protective layers and coupling elements. The addition of these layers, however, can lead to larger cables, which are not only more costly to produce and store but also heavier, stiffer, and thus more difficult to install.

Manufacturers have typically addressed these problems by employing water-blocking, thixotropic compositions (e.g., grease or grease-like gels). For example, filling the free space inside a buffer tube with water-blocking, petroleum-based filling grease helps to block the ingress of water. Further, the thixotropic filling grease mechanically (i.e., viscously) couples the optical fibers to the buffer tube.

That usefulness notwithstanding, such thixotropic filling greases are relatively heavy and messy, thereby hindering connection and splicing operations. Consequently, filling greases carry certain disadvantages.

Accordingly, there is a need for a dry composition that facilitates improved coupling of optical fibers within a buffer tube.

SUMMARY OF THE INVENTION

Accordingly, in one aspect, the invention embraces a coupling composition that is used within an optical fiber cable. The coupling composition is a soft, cohesive gel (or a foamed material made therefrom) that protects the optical fibers. In addition, the coupling composition (e.g., an oil-expanded polymeric material) provides adequate coupling of the optical fibers yet permits localized movement (lateral and longitudinal) of optical fibers within the buffer tube.

In another aspect, the invention embraces optical fiber cables that use the cohesive gel coupling composition. For instance, the coupling composition may fully or partially fill the free space surrounding the optical fibers within the buffer tube. Coupling provided by elements formed from the present coupling composition is superior to that provided by conventional water-swellable tapes.

The foregoing, as well as other characteristics and advantages of the invention and the manner in which the same are accomplished, is further specified within the following detailed description and its accompanying drawings.

DETAILED DESCRIPTION

Figure 1A:
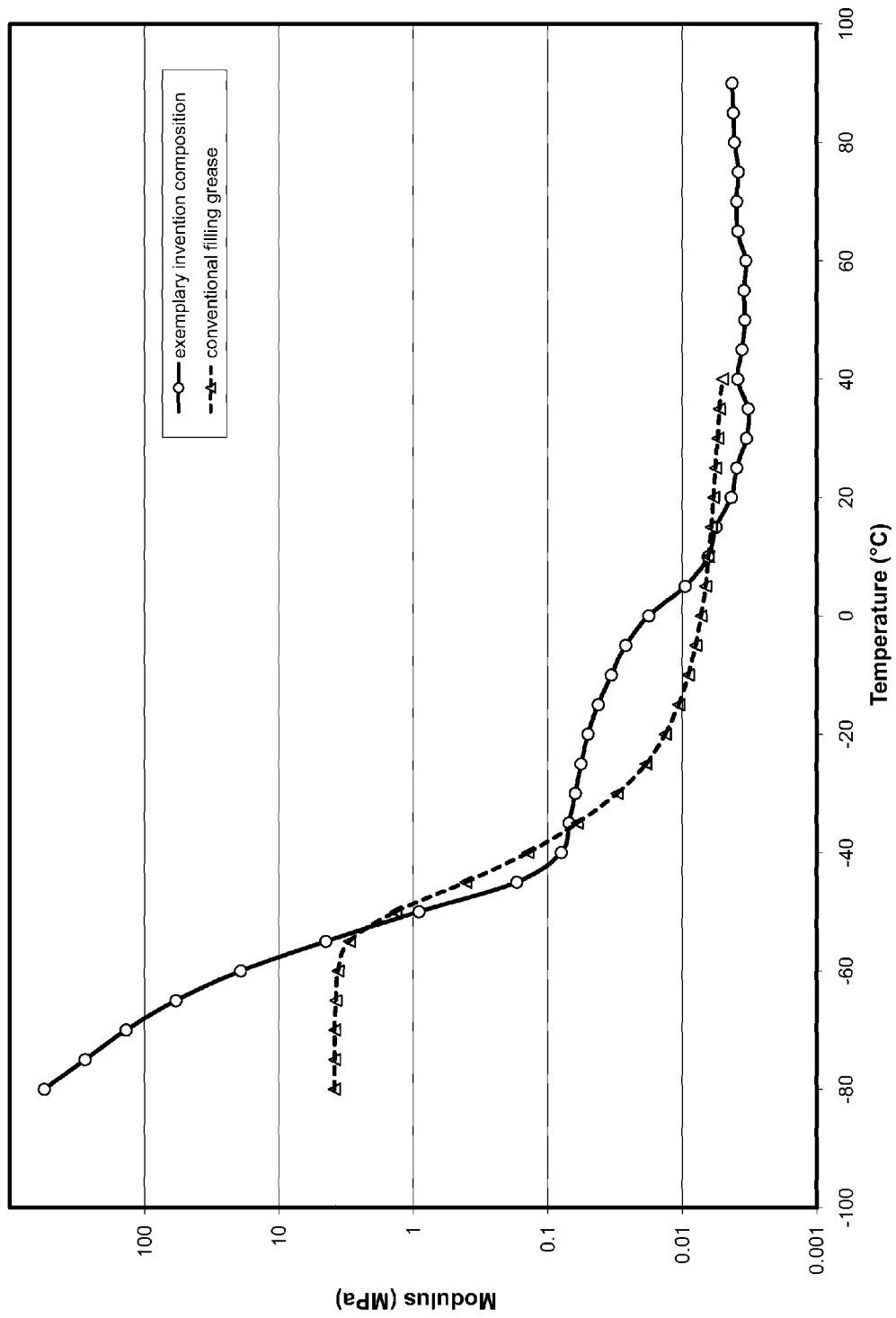
FIG. 1A compares the temperature-dependent modulus of an exemplary coupling composition according to the present invention with that of conventional hydrocarbon-based filling grease.

In one aspect, the invention embraces a soft coupling composition that is used within optical fiber cables. The coupling composition not only protects the optical fibers but also couples the optical fibers and the surrounding buffer tube casing.

The coupling composition according to the present invention is formed from a blend of high-molecular weight elastomeric polymers (e.g., about 35 weight percent or less) and oils (e.g., about 65 weight percent or more) that flow at low temperatures. Unlike conventional filling greases, the coupling composition is typically dry and, therefore, less messy during splicing. As set forth herein, the coupling composition (e.g., plasticized high-molecular weight elastomeric polymers) may be employed as a cohesive gel or foam.

The high-molecular weight polymers used in the coupling composition are typically thermoplastic elastomeric block copolymers, such as styrene-butadiene (SB), styrene-butadiene-styrene (SBS), styrene-isoprene-styrene (SIS), styrene-ethylene/butylene-styrene (SEBS), and styrene-ethylene/propylene-styrene) (SEPS). For use in coupling composition according to the present invention, these elastomeric block copolymers typically have a number-average molecular weight of at least about 100,000 g/mol (e.g., 100,000 g/mol to 500,000 g/mol). Those having ordinary skill in the art will appreciate that the foregoing styrenic block copolymers (SBCs) include at least one soft elastomeric block and at least one hard polystyrene block. For instance, the triblock SEBS copolymer includes two hard polystyrene end blocks and a soft elastomeric poly(ethylene/butylene) midblock.

The oils used in the coupling composition further soften the elastomeric block copolymers and generally do not crystallize or form wax precipitates at low temperatures. Such oils possess a pour-point of −15° C. or less and more typically a pour-point of −25° C. or less (e.g., −30 to −35° C.). Synthetic hydrocarbon oils, such as highly branched isoparaffinic polyalphaolefins (PAOs), perform well in this regard. (Mineral oils tend to have higher pour-points than do synthetic polyalphaolefins.) Exemplary synthetic hydrocarbon oils possess a pour-point of −25° C. or less (e.g., −30° C. to −50° C.), perhaps even −40° C. or less (e.g., −45° C. to −65° C.).

Synthetic hydrocarbon oils (e.g., polyalphaolefins) typically possess a viscosity of 2-40 centistokes at 100° C., more typically 5-9 centistokes at 100° C. (e.g., 6-8 centistokes at 100° C.). Exemplary synthetic oils having acceptable pour-point and viscosity are available from Chevron Phillips under the trade name SYNFLUID PAO.

To facilitate processing, the coupling composition may optionally include a lubricant or similar processing aid. For instance, the coupling composition can be enhanced with lubricants in amounts up to about 5 weight percent. As will be known to those having ordinary skill in the art, lubricants should possess an aversion to the polymers and plasticizers in the coupling composition; in this way, surface migration of lubricants reduces friction between the coupling composition and processing equipment, thereby facilitating polymer processing (e.g., extrusion). Lubricants can also reduce friction between the coupling composition and other material during use within optical fiber cables.

The coupling composition can be enhanced with other additives, too, such as antioxidants, detackifiers (i.e., to reduce stickiness when the optical fibers are accessed), and water-swellable particulate powders. Those having ordinary skill in the art will appreciate that antioxidants provide thermal stability (e.g., reduce thermal degradation of the coupling composition). As described herein, water-swellable particulate powders embrace super absorbent polymers (SAPs), such as particulates of sodium polyacrylate, polyacrylate salt, or acrylic acid polymer with sodium salt, and can be blended into the coupling composition or applied surficially to the composition (e.g., during manufacture of optical fiber cables). Furthermore, the coupling composition may include fillers, such as hollow microspheres.

The coupling composition possesses excellent elasticity: at standard temperature and pressure, it has an elongation to break of at least about 100 percent, typically at least about 250 percent, and more typically at least about 500 percent. In some instances, the coupling composition may possess an elongation to break of at least about 1,000 percent or more (e.g., about 1,500 percent).

Furthermore, the coupling composition is tear resistant and durable: at standard temperature and pressure, it has tensile strength of at least about 100 psi and typically at least about 400 psi. In some instances, the coupling composition may possess a tensile strength of about 1,000 psi or more.

As used herein, standard temperature and pressure refers to testing conditions of 50 percent relative humidity at 70° F. (i.e., about 20° C.) and atmospheric pressure (i.e., 760 torr).

Blends of super-high molecular weight polymeric materials and oils that are capable of flowing at low temperatures (i.e., possessing a low pour point) can yield soft, cohesive gels (i.e., coupling materials) that provide exceptional performance in optical fiber cables. The cohesive gels formed from these polymer/oil blends usually possess a melt flow temperature of at least about 80° C. (e.g., 90° C. or more).

Typical polymer/oil blend ratios are between 30:70 and 5:95, more typically less than 15:85 (e.g., 8-12 weight percent polymer), and in some instance less than 10:90 (e.g., 5-9 weight percent polymer). Compared with lower molecular weight polymers, the super-high molecular weight polymers employed in the present polymer/oil blends seem to be capable of absorbing relatively higher amounts of oil.

The tensile strength of the cohesive gels tends to be proportional to the weight fraction of the super-high molecular weight polymers (i.e., higher polymer fraction yields higher tensile strength). Elasticity (e.g., elongation to break) is roughly comparable across these aforementioned blend ranges (i.e., between about 5 and 30 weight percent super-high molecular weight polymer).

As used herein and unless otherwise specified, molecular weight refers to number-average molecular weight, rather than weight-average molecular weight.

Excellent elastomeric block copolymers for use in the present polymeric/oil blends include styrene-ethylene/butylene-styrene copolymers (i.e., with an S-EB-S block structure) having a number-average molecular weight of about 100,000 g/mol or more, and typically about 200,000 g/mol or more (as measured by gel permeation chromatography) (e.g., 200,000 to 2,000,000 g/mol). In contrast to more conventional SEBS copolymers (e.g., having an A-B-A block structure), the super-high molecular weight SEBS copolymers possess relatively longer polymeric segments (i.e., having an AA-BB-AA block structure).

The SEBS copolymers possess excellent weatherability and, at super-high molecular weights, demonstrate elevated elongation to break. An exemplary, super-high molecular weight styrene-ethylene/butylene-styrene block copolymer has a styrene/rubber ratio of about 1:2 (e.g., 3:7 or 2:3) and a Shore A hardness of about 60 (e.g., 55-65); it is commercially available under the trade name KRATON G-1651. Those having ordinary skill in the art will appreciate that the present coupling composition, which includes at least about 65 weight percent oil (e.g., 80 percent or more oil), is substantially softer than conventional dry coupling materials. The present coupling composition typically possesses Shore A hardness of less than about 25, more typically less than about 10 (e.g., a Shore 00 hardness of less than about 50).

As used herein, hardness is used to describe thermoplastic elastomers and the like (and polymer/oil blends made therefrom). Hardness, which reflects a material's resistance to indentation upon the application of a static load, is conveniently measured using an appropriate Shore durometer (e.g., a Shore A durometer). The Shore A hardness scale is typically used for soft rubbers and the like; the Shore 00 hardness scale is typically used for foams that have Shore A hardness of less than about 5 (e.g., a Shore 00 hardness of less than about 45.) The coupling composition of the present invention typically possesses a modulus at the low end of the Shore A scale. Shore hardness is typically measured at standard temperature and pressure.

As will be understood by those having ordinary skill in the art, elastic modulus describes how readily a material will deform under the application of stress. In other words, it is a measure of the softness of the material.

Surprisingly, the coupling composition according to the present invention provides outstanding modulus over a wide temperature range. The present coupling composition retains softness at temperatures below −40° C. and retains its integrity as a cohesive gel (or foam) at temperatures of 70-80° C. This unexpected stability from very cold temperatures to very warm temperatures provides superior performance to optical fiber cables employing the coupling composition according to the present invention.

FIGS. 1A, 1B, 1C, and 1D compare, over a broad temperature range, the modulus of an exemplary non-foamed coupling composition according to the present invention with the modulus of other compositions that might be employed in optical fiber cables. (As noted, FIG. 1E is simply the compilation of FIGS. 1A, 1B, 1C, and 1D.) The exemplary coupling composition depicted in FIGS. 1A-1D is a blend of about 6.5 weight percent high-molecular weight styrene-ethylene/butylene-styrene (SEBS) polymers, which is available under the trade name KRATON G-1651, and synthetic hydrocarbon oil having a viscosity of about 6-8 centistokes at 100° C., which is available under the trade name SYNFLUID PAO.

As illustrated in FIG. 1A, as a cohesive gel, the exemplary coupling composition possesses comparable modulus (i.e., softness) to that of conventional hydrocarbon-based filling grease. Moreover, this exemplary coupling composition possesses superior performance at elevated temperatures as compared with conventional hydrocarbon-based filling grease, which performs poorly, if at all, above 40° C. (i.e., dripping). (Those having ordinary skill in the art will appreciate that, as a foamed material, the coupling composition will be even softer.)

Figure 1B:
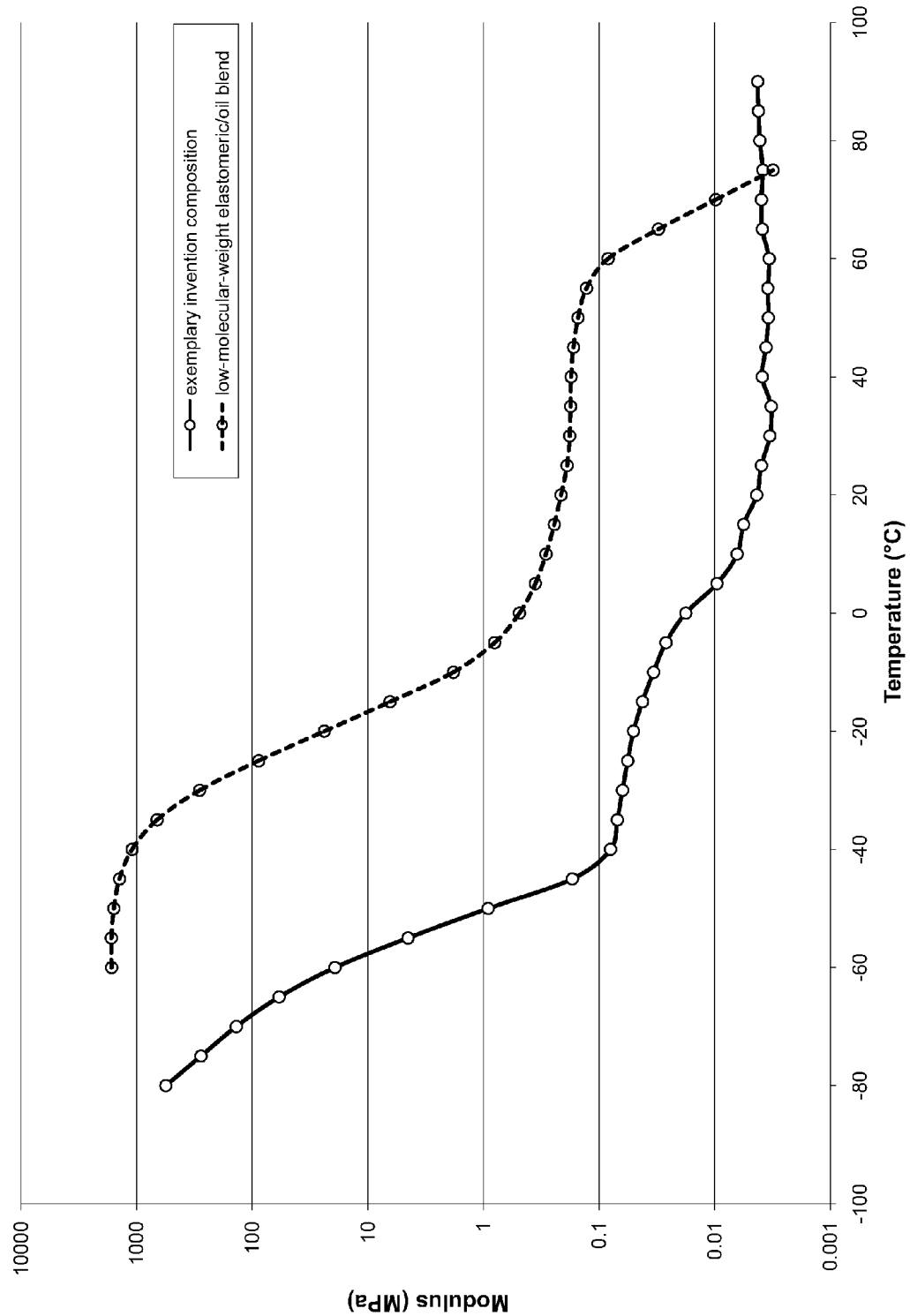
FIG. 1B compares the temperature-dependent modulus of an exemplary coupling composition according to the present invention with that of a conventional blend of lower molecular weight elastomeric polymers and oil.

As illustrated in FIG. 1B, the exemplary coupling composition possesses superior modulus from −80° C. to 80° C. as compared with a conventional blend of lower-molecular-weight elastomeric polymers (i.e., conventional SEBS copolymers) and oil. Indeed, FIG. 1B indicates that the comparative low-molecular-weight elastomer/oil blend begins to melt at less than 60° C.

As noted, in contrast to the super-high molecular weight polymers used in the coupling composition, lower molecular weight copolymers are incapable of absorbing relatively higher amounts of oil. Consequently, comparative polymer/oil blends like that depicted in FIG. 1B require higher polymer fractions, typically 50 weight percent or more.

Figure 1C:
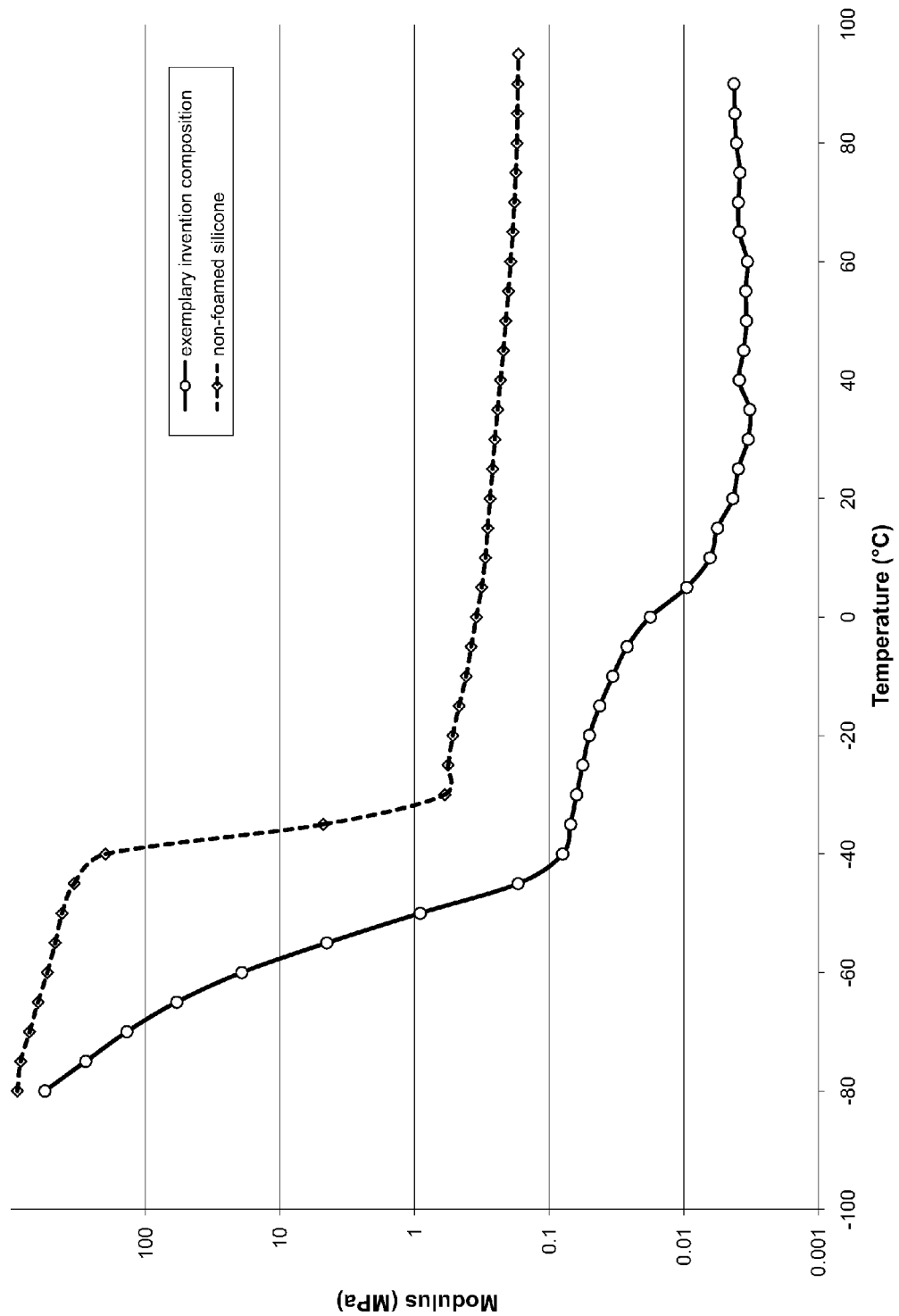
FIG. 1C compares the temperature-dependent modulus of an exemplary coupling composition according to the present invention with that of a conventional high-performance silicone.
Figure 1D:
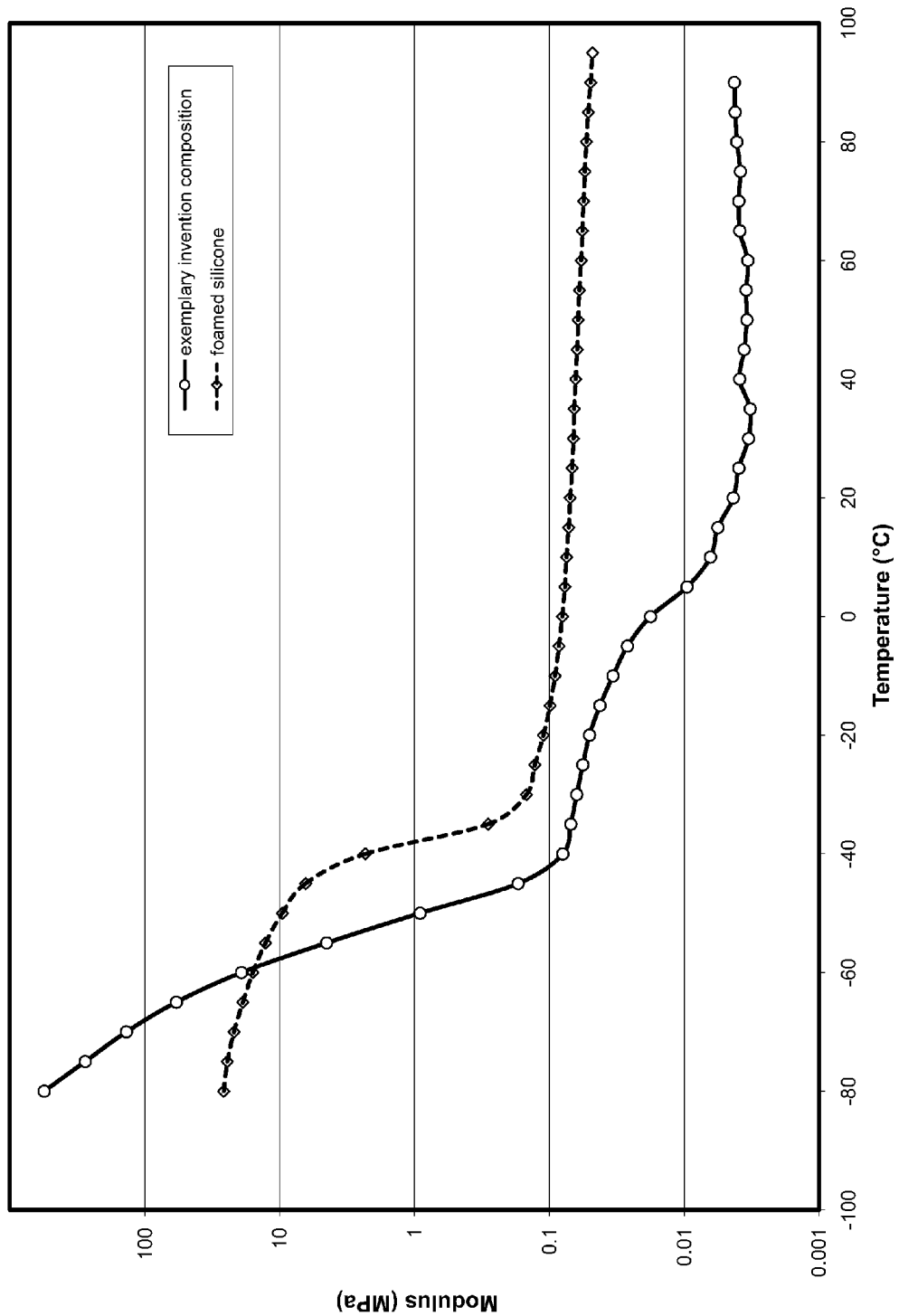
FIG. 1D compares the temperature-dependent modulus of an exemplary coupling composition according to the present invention with that of a conventional high-performance silicone foam.
Figure 1E:
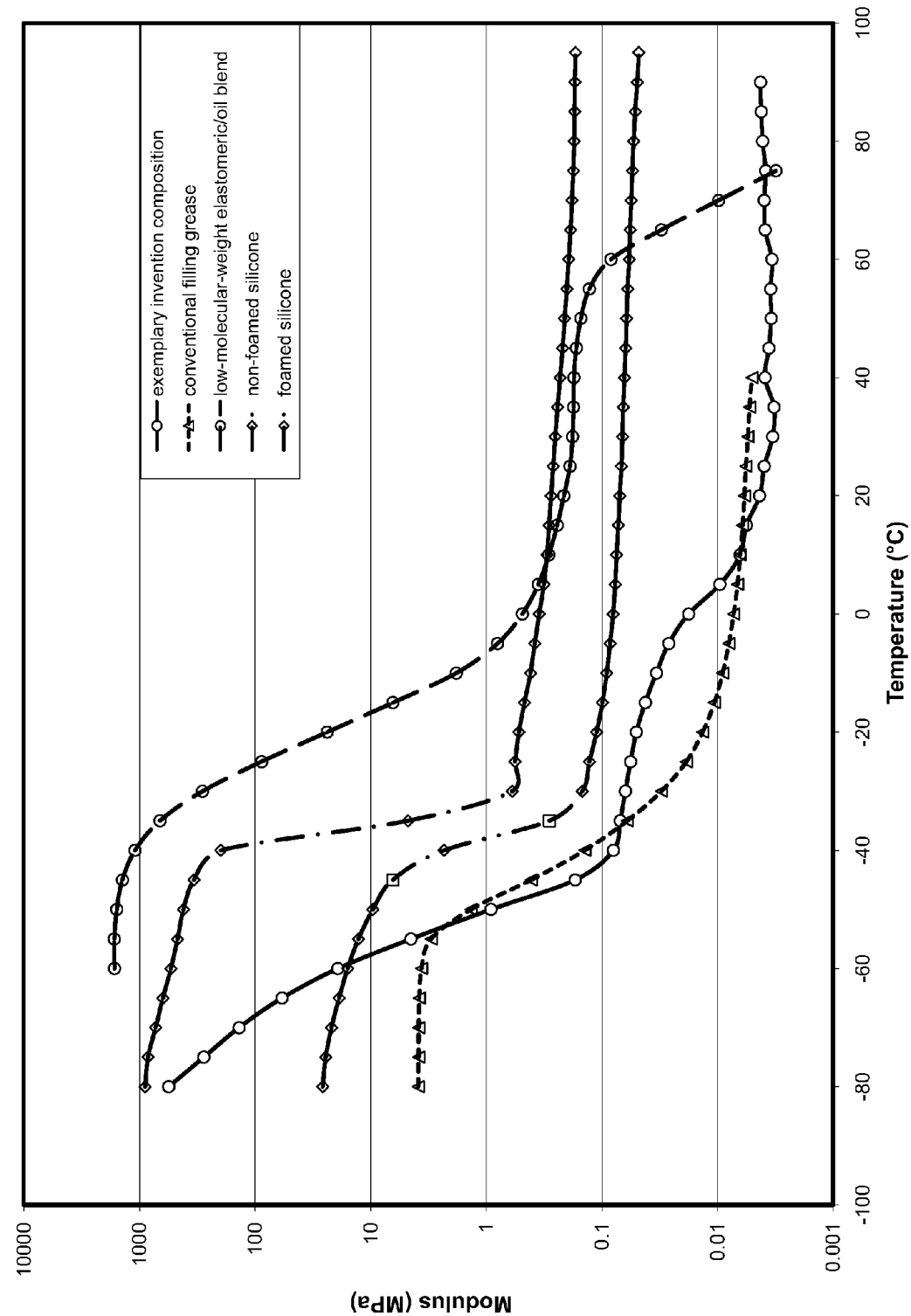
FIG. 1E is a compilation of FIGS. 1A, 1B, 1C, and 1D.

Likewise, as illustrated in FIG. 1C and FIG. 1D, the exemplary coupling composition possesses superior modulus even as compared with high-performance silicones, which are generally thought to provide exceptional softness (i.e., low elastic modulus). As shown in FIG. 1C, compared with conventional non-foamed silicone, the coupling composition in the form of a cohesive gel possesses substantially lower elastic modulus over a broad temperature range (i.e., −80° C. to 80° C.). As shown in FIG. 1D, compared with conventional silicone foam, the coupling composition in the form of a cohesive gel possesses significantly lower elastic modulus over a broad temperature range.

As will be appreciated by those having ordinary skill in the art, super-high molecular weight elastomeric block copolymers, particularly styrene-ethylene/butylene-styrene copolymers, have not been successfully employed commercially in communication cables. Plasticizing even modest weight fractions (e.g., 3 weight percent or more) of super-high molecular weight styrene-ethylene/butylene-styrene block copolymers is difficult, requiring unconventionally high processing temperatures (e.g., 250-350° F. or higher). In addition, the coupling composition's relatively high fractions of oil (e.g., more than about 75 weight percent) depress melt strength, thereby making extrusion blending and pelletizing impractical (e.g., the blend cannot be easily pelletized, if at all). Indeed, the coupling compositions of the present invention have been processed as a high-viscosity liquid at temperatures of between 375° F. and 425° F., and might be processed at 450° F. or higher.

Satisfactory oils used in the coupling composition should plasticize the elastomeric block copolymers but not the polymeric materials that are conventionally employed for buffer tube casings, particularly polyolefins having low glass transition temperatures (e.g., less than about 10° C.). In this regard, polyethylene is reported to possess a glass transition temperature as low as about –130° C.; polypropylene is reported to possess a glass transition temperature of about 0° C. (isotactic) and –20° C. (atactic).

Those having ordinary skill in the art will recognize that polybutylene terephthalate polyester (PBT) has been used to make buffer tube casings. Polybutylene terephthalate tends to resist oil absorption but is relatively expensive. Other polymers, such as polyamides (i.e., nylon), tend to absorb water and thereupon swell and soften, which, in practice, leads to excess fiber length upsets. Polyvinyl chloride (PVC) tends to crack, among other problems, rendering it a less favored buffer tube material. Consequently, polyolefinic buffer tubes are more commercially practical. In some instances, such buffer tubes may be formed from fluorinated polyolefins (e.g., fluorinated ethylene propylene).

Accordingly, the most acceptable oils possess low absorbability in polyethylene or polypropylene, either of which is a cost-effective polymeric material suitable for buffer tube casings. If absorbability in polyethylene or polypropylene is relatively high, conventional polyolefin buffer tubes (e.g., polyethylene or polypropylene casings) will tend to absorb excessive quantities of oil. As will be appreciated by those having ordinary skill in the art, excessive oil absorption will cause polyolefin buffer tubes to swell and, more importantly, to soften, thereby causing a loss in crush resistance. Synthetic hydrocarbon oils, such as highly branched isoparaffinic polyalphaolefins (PAOs), possess low absorbability in either polyethylene or polypropylene and are thus especially suited for the coupling compositions of the present invention. As those having ordinary skill in the art will appreciate, substantially pure synthetic polyalphaolefinic oils possess negligible aromatic and/or naphthalenic content (i.e., based on atomic carbon fractions).

In addition, exemplary synthetic hydrocarbon oils possess an absorbability in polyethylene and/or polypropylene of less than 20 percent, typically less than 15 percent (e.g., 8-12 percent), more typically less than 10 percent (e.g., 4-8 percent), and most typically less than 5 percent (e.g., 2-3 percent). As used herein, the concept of absorbability describes an oil's ability at 85° C. to saturate a particular polymer and is measured by that polymer's weight percent increase as a result of oil absorption to saturation. For instance, an oil having 7 percent absorbability in polypropylene means that a 100 gram sample of polypropylene absorbs 7 grams of oil after aging for about a month (e.g., 30 days) at 85° C. (and measured at standard temperature and pressure).

In accordance with the foregoing, one exemplary coupling composition is a cohesive gel formed from a blend of super-high molecular weight styrene-ethylene/butylene-styrene (SEBS) copolymers (e.g., possessing a number-average molecular weight of about 200,000 g/mol or higher) and synthetic hydrocarbon oils, particularly polyalphaolefins (PAOs), having a pour-point of less than about –25° C. (e.g., –35° C. or less) and an absorbability in polyethylene and/or polypropylene of less than about 10 percent (e.g., 1-4 percent). For instance, a PAO oil having a viscosity of about 6 centistokes at 100° C. possesses a pour-point of –63° C.

Another exemplary coupling composition is a cohesive gel formed from a blend of the high molecular weight styrene-ethylene/butylene-styrene (SEBS) copolymers and synthetic hydrocarbon oils having (i) a pour-point of less than about –15° C. and an absorbability in polyethylene and/or polypropylene of less than about 5 percent (e.g., 2-3 percent) and/or (ii) a pour-point of less than –35° C. and an absorbability in polyethylene and/or polypropylene of less than about 15 percent (e.g., 2-3 percent).

In accordance with the foregoing, these exemplary embodiments of the polymer/oil cohesive gel can be formed by blending (i) between about 5 and 15 weight percent (e.g., 7-13 weight percent) of the super-high molecular weight styrene-ethylene/butylene-styrene block copolymers, such as those available under the trade name KRATON G-1651 and (ii) at least about 85 weight percent of a polyalphaolefin synthetic oil having a viscosity of 5-8 centistokes at 100° C., such as that available under the trade name SYNFLUID PAO (e.g., SYNFLUID PAO 6). The resulting cohesive gels typically possess specific gravity of less than 1.0 (e.g., 0.8-0.95). As noted, this kind of synthetic polyalphaolefinic oil possesses negligible aromatic and/or naphthalenic content.

Those having ordinary skill in the art will appreciate polymer/oil cohesive gels that are suitable for use in polyolefin buffer tubes are typically suitable, too, for use in polybutylene terephthalate buffer tubes. As noted, polybutylene terephthalate possesses excellent oil resistance (i.e., low absorption). Accordingly, polybutylene terephthalate buffer tubes may be substituted for polyolefinic buffer tubes.

Working Example

Styrene-ethylene/butylene-styrene block copolymers possessing a number-average molecular weight of about 200,000 g/mol or higher, commercially available under the trade name KRATON G-1651, were slowly blended into a highly branched isoparaffinic polyalphaolefin oil that was preheated to about 290° F. The polymer/oil blend ratio was about 6.5:93.5. The polyalphaolefin oil, commercially available from Chevron Phillips under the trade name SYNFLUID PAO 7, had a viscosity of about 7 centistokes at 100° C. The mixture was blended for 30-60 minutes, and then the resultant coupling composition was poured under pressure into barrels. Thereafter, the coupling composition was melted and pumped through a die and thereby integrated into an optical fiber cable.

The styrene-ethylene/butylene-styrene block copolymers and the polyalphaolefin oil can be (and perhaps should be) mixed at higher temperatures (e.g., 300-350° F. or more) to facilitate improved blending. This, however, requires modified processing equipment (e.g., oil-jacketed hot-melt adhesive equipment).

The foregoing coupling compositions are useful in the form of cohesive gels and/or foams in various optical fiber cables. Indeed, the superior performance of the coupling compositions according to the present invention permits many different cable configurations. The following exemplary cable embodiments provide various configurations using the coupling compositions as previously described.

In another aspect, the invention embraces optical fiber cables that use the coupling composition in the form of a cohesive gel or a foam (e.g., fully or partially foamed). Moreover, the coupling composition may fully or partially fill the free space surrounding the optical fibers within the buffer tube.

Employing the coupling composition as a foam reduces the filler weight, of course, but also transforms the otherwise incompressible coupling composition into a compressible coupling material. The foamed coupling composition is relatively softer as compared with an otherwise identical non-foamed coupling composition.

The cohesive gel coupling composition of the present invention (e.g., plasticized high-molecular weight elastomeric polymers) may be foamed to achieve density reductions of 30-60 percent or more (e.g., 40-70 percent). Such density reductions may be achieved using a chemical blowing agent (CBA), gas injection, or high-speed mixing (i.e., whipping). Those having ordinary skill in the art will appreciate that density reductions of 90 percent or more may be achievable under appropriate conditions (e.g., viscosity, temperature, gas flow, and/or mixing rate). Those having ordinary skill in the art will appreciate that foaming may be achieved using air or an inert gas, such as nitrogen, argon, or carbon dioxide.

With respect to the effects of foaming, elasticity (e.g., elongation to break) is comparable for foamed and non-foamed cohesive gels, but tensile strength tends to be proportional to the material density (e.g., a 25 percent density reduction yields a 25 percent tensile strength reduction).

Those having ordinary skill in the art will appreciate that, as a general matter, solids are incompressible. Many seemingly solid structures (i.e., colloidal foams) will compress under pressure. This apparent compression, however, is thought to be the result of either compression (e.g., closed-cell foams) or ejection (e.g., open-cell foams) of entrained gas bubbles rather than compression of the solid material itself. With respect to the present coupling composition, closed-cell foams provide inherent water-blocking and so are especially useful in buffer tube casings (i.e., surrounding optical fibers).

The coupling composition according to the present invention may be incorporated into an optical fiber cable in various configurations. The coupling composition helps to protect the optical fiber element from microbending or macrobending, couples the optical fiber element to the buffer tube, and in some cases provides some level of water blocking. In this regard, the coupling composition can fully or partially fill the free space between the buffer tube and the optical fiber element.

For instance, the coupling composition may be incorporated into conventional cable designs. In the optical fiber cable embodiment depicted in FIG. 2, a coupling element 18 formed from the coupling composition according to the present invention substantially fills the space between the inner wall of a buffer tube 16 and an optical fiber element 12 (e.g., a ribbon stack) enclosed within the buffer tube 16. Those having ordinary skill in the art will appreciate that the coupling element 18 may fill the buffer tube 16 completely or only partly, so long as the optical fiber element 12 is at least partially disposed within the coupling composition that forms the coupling element 18 (e.g., embedded in the coupling composition).

By filling the buffer tube 16 with the coupling composition, the coupling element 18 couples the optical fiber element 12 to the buffer tube 16 and protects the optical fiber element 12 from forced contact with the inner wall of the buffer tube 16. Such forced contact can cause microbending or macrobending and thus signal attenuation. Additionally, by at least partly filling the buffer tube 16, the coupling element 18 helps to block the intrusion of water into the buffer tube 16 or, if water intrusion occurs, helps to block movement of water along the length of the buffer tube 16. Accordingly, the coupling composition as used in this embodiment—in the form of a cohesive gel and/or foam—serves many of the functions of the filling greases commonly used in the industry, albeit without the problems associated with such greases.

Figure 2:
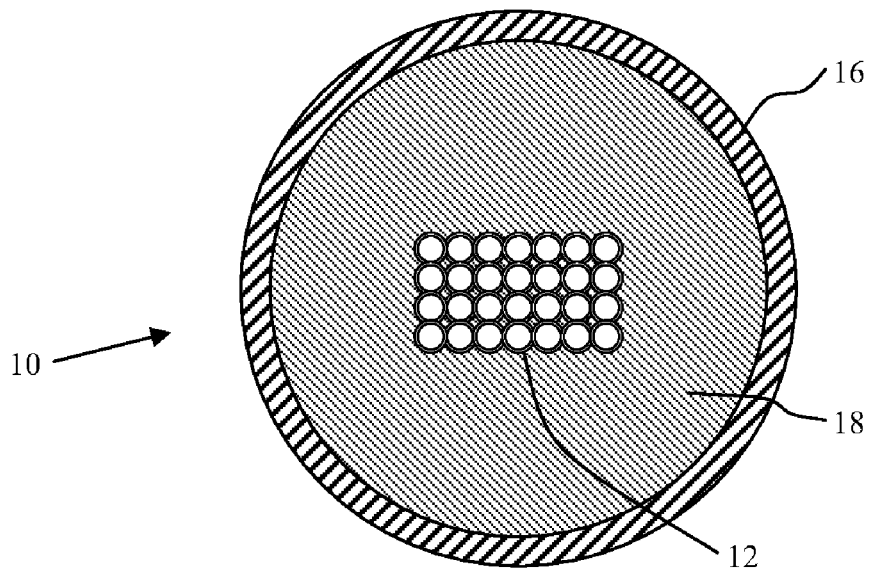
FIG. 2 depicts a cross-sectional view of an optical fiber cable in which the coupling composition according to the present invention substantially fills the free space between the inner wall of a buffer tube and the optical fiber ribbon stack.

The optical fiber cable 10 depicted in FIG. 2 can be achieved, for example, by co-extruding the coupling element 18 with the buffer tube 16 to not only surround the optical fiber element 12 but also bond the coupling element 18 and the buffer tube 16 together. Alternatively, the optical fiber cable 10 depicted in FIG. 2 can be achieved, for example, by extruding the coupling composition directly on and around the optical fiber element 12, and then placing the resulting coupling element 18 and embedded optical fiber element 12 (e.g., a twisted ribbon stack) into a buffer tube 16 such that the coupling element 18 substantially fills the free space between the inner wall of a buffer tube 16 and the optical fiber element 12 (e.g., a twisted ribbon stack). (As described herein, forcing the coupling element 18 and embedded optical fiber element 12 (e.g., a twisted ribbon stack) into a buffer tube 16 that has been formed, cooled, and solidified might eliminate process shrinkage problems (e.g., excess length).)

For example, the optical fiber cable 10 can be achieved by embedding (e.g., coating) via extrusion the optical fiber element 12 (e.g., optical fibers or ribbon stack) with the coupling composition (i.e., thereby forming coupling element 18). After cooling the coated fiber optic bundle (e.g., using air and/or water), the embedded optical fiber element 12 is inserted into a pre-extruded, pre-slit buffer tube 16. A fixture acting as a "plow" opens the pre-slit buffer tube 16 to permit insertion of the embedded optical fiber element 12.

Excess optical fiber length (EFL) and excess ribbon length (ERL) are generally achieved by controlling the tension in both the buffer tube 16 and the optical fiber element 12 during the aforementioned insertion step. If deemed necessary, a tape can be applied over the buffer tube slit, or the slit can be welded closed. The extruded coupling composition positioned directly on and around the optical fiber element 12 is likely to provide sufficient protection.

Figure 3:
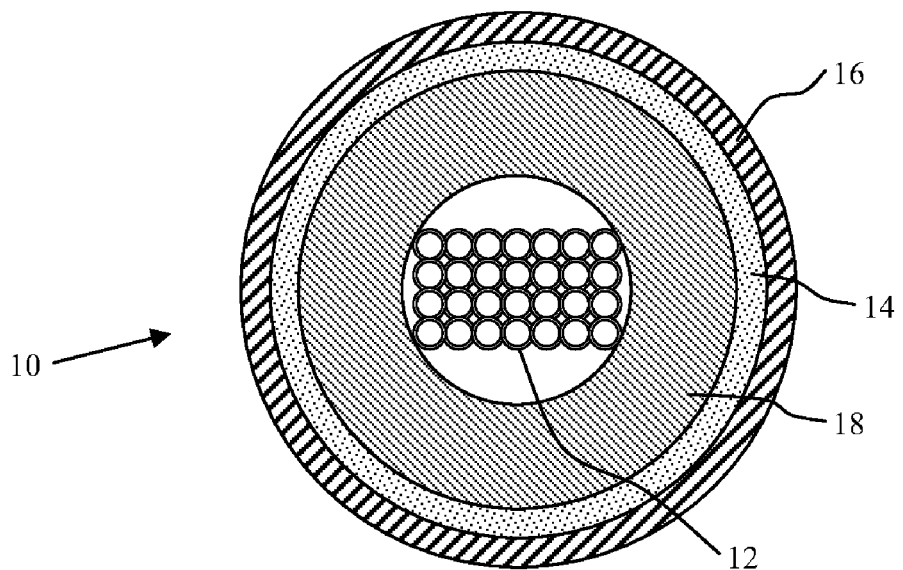
FIG. 3 depicts a cross-sectional view of an optical fiber cable in which the coupling composition according to the present invention fills the buffer tube to provide limited contact with the optical fiber ribbon stack.

In another optical fiber cable embodiment depicted in FIG. 3, rather than completely filling a buffer tube 16, the coupling element 18 is sized such that it fills the buffer tube 16 only as much as is necessary to create contact with the optical fiber element 12. (Those having ordinary skill in the art may recognize that this more conventional structure has been proposed using conventional compressible materials, but not, of course, using the novel composition of the present invention.)

As illustrated in FIG. 3, a coupling element 18 formed of the present coupling composition may be sized to just touch the outermost edges of the optical fiber element 12. In this configuration, the coupling element 18 is not required to apply a compressive force on the optical fiber element 12, but any radial movement of the optical fiber element 12 within the buffer tube 16 is resisted. Accordingly, the present coupling composition may be employed as a cohesive gel and/or foam.

Alternatively, a coupling element 18 formed of the coupling composition at least partly in the form of a compressible foam (i.e., compressible structure) can be sized to require squeeze coupling of the optical fiber element 12 to the buffer tube 16. In this configuration, the coupling element 18 exerts a force on the optical fiber element 12 to restrain the optical fiber element 12 in place within the buffer tube 16. To achieve this, the part of the coupling element 18 adjacent to the optical fiber element 12 is typically a foam. It is within the scope of the present invention (and particular optical fiber cable embodiment), however, to include a cohesive gel in the coupling element 18, typically configured away from the optical fiber element 12 (e.g., the coupling element 18 includes a foam layer adjacent to the optical fiber element 12 and a cohesive gel nearer the buffer tube 16). It is also within the scope of the present invention (and particular optical fiber cable embodiment) to include a cohesive gel in the coupling element 18 adjacent to the optical fiber element 12 provided the coupling element 18 includes some portion that is compressible (i.e., to facilitate the squeeze coupling of the optical fiber element 12).

As shown in FIG. 3, the optical fiber cable 10 may further include a water-swellable element 14 (i.e., a water-blocking material) positioned adjacent to the inner wall of the buffer tube 16 between the optical fiber element 12 and the inner wall of the buffer tube 16. The water-swellable element 14 helps to block the ingress of water into the core of the optical fiber cable 10 or, if water intrusion occurs, helps to prevent the movement of water along the length of the optical fiber cable 10. The water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

In another embodiment, an optical fiber cable 10 likewise includes an optical fiber element 12 and a coupling element 18 enclosed within a buffer tube 16. As before, the coupling element 18 is composed of or otherwise formed from the coupling composition according to the present invention as either a cohesive gel and/or foam. In this optical fiber cable embodiment, however, the coupling element 18 is sized and positioned within the buffer tube 16 to provide sufficient coupling space to accommodate the optical fiber element 12 without forced contact. In other words, the optical fiber element 12 can fit within the coupling element 18 such that there is free space between the optical fiber element 12 and the coupling element 18 around the full perimeter of the optical fiber element 12 (i.e., "annular free space").

FIGS. 4, 6, 7, 8, and 9 depict cross-sectional views of various exemplary optical fiber cables 10. Those having ordinary skill in the art will appreciate that, according to FIGS. 6 and 7, the discrete portions of the coupling element 18 may be alternately formed, for instance, from the coupling composition according to the present invention in the form of a cohesive gel and foam.

As used herein, the concept of "coupling space" refers to the inner cable region (i.e., the free space) in which the optical fiber element 12 is positioned. As will be recognized by those having ordinary skill in the art, the coupling space is typically defined by the configuration of the coupling element 18.

Figure 4:
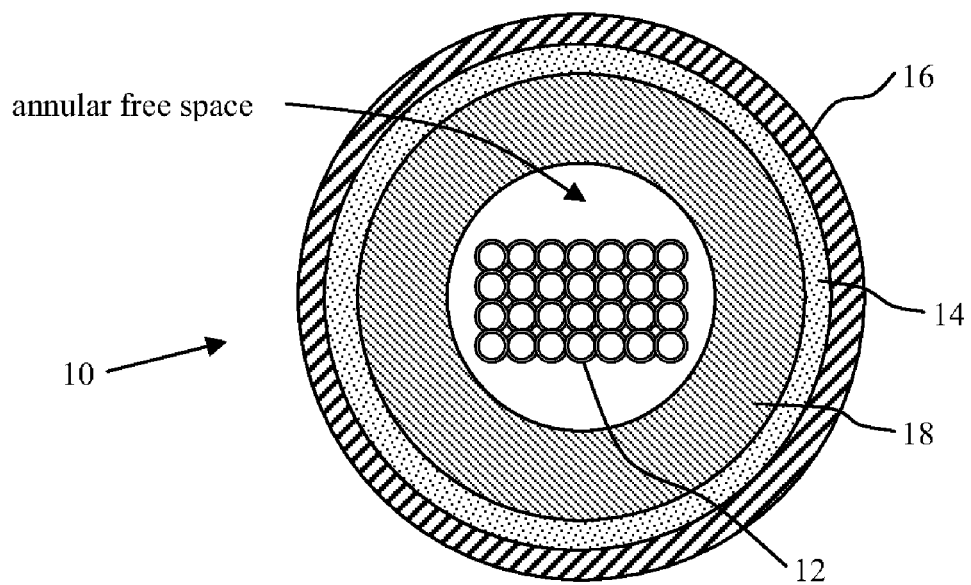
FIG. 4 depicts a cross-sectional view of an optical fiber cable in which the coupling composition according to the present invention defines annular free space about the optical fiber ribbon stack.
Figure 10:
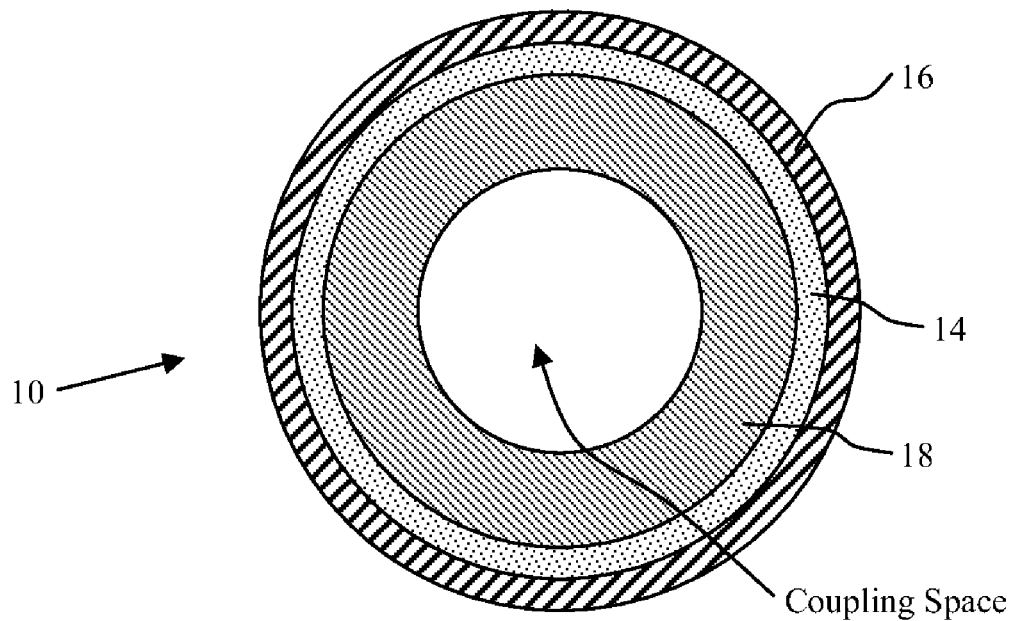
FIG. 10 depicts a cross-sectional view of an optical fiber cable according to one embodiment of the present invention to illustrate the optical fiber cable's coupling space.
Figure 11:
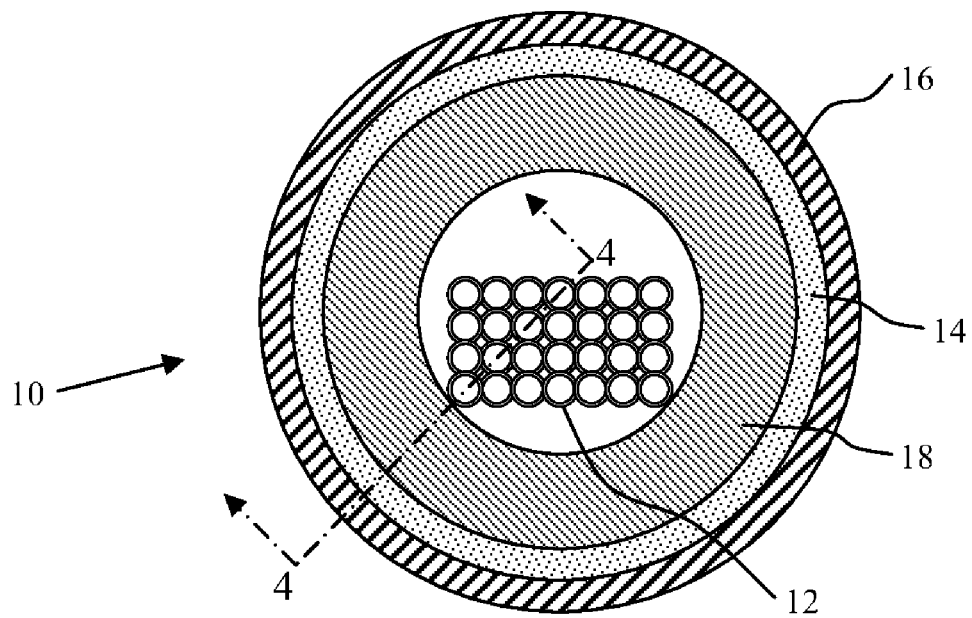
FIG. 11 depicts a cross-sectional view of an optical fiber cable in which an optical fiber element is in contact with a coupling element formed from the coupling composition according to the present invention.

FIG. 10 illustrates the "coupling space" of the optical fiber cable 10 depicted in FIGS. 4 and 10. (For clarity, FIG. 10 omits the optical fiber element 12.) FIG. 11 depicts another cross-sectional view of the kind of optical fiber cable 10 depicted in FIG. 4.

Moreover, as used herein in this context, the term "annular free space" is intended to characterize unfilled space that can exist between the optical fiber element 12 and its surrounding elements (e.g., the coupling element 18) around the entire perimeter of the optical fiber element 12, regardless of the respective shapes of the optical fiber cable 10 and its components (e.g., a rectangular ribbon stack within a round coupling insert as depicted in FIG. 4). In this regard, the term "annular free space" as used herein is not limited to the regular gap between two concentric tubes (or casings) having circular cross-sections (i.e., a perfect annulus).

FIG. 4 demonstrates how an optical fiber cable 10 can define "annular free space" surrounding the optical fiber element 12 (and thereby satisfy the concept of "annular free space" as used herein). In general, an optical fiber element 12 that is sized and configured to fit within a buffer tube 16 in a way that does not require contact with its surrounding elements—typically the coupling element 18—will be capable of defining annular free space within the optical fiber cable 10 (i.e., contact-free placement).

Those having ordinary skill in the art will understand that the formation of annular free space will occur, if at all, over discrete segments of the optical fiber cable 10. Over any extensive length of the optical fiber cable 10, some contact between the optical fiber element 12 and the coupling element 18 is virtually assured (i.e., optical cables as used in the field are subjected to bending). (Indeed, as discussed herein, in some optical fiber cable embodiments that employ the present coupling composition, it is interference contact that promotes advantageous coupling of the optical fiber element 12 and buffer tube 16.) To the extent the optical fiber element 12 and the coupling element 18 are capable of defining annular free space around the entire perimeter of the optical fiber element 12, annular free space will likely be present within the optical fiber cable 10, thereby reducing unwanted microbending and macrobending effects.

As used herein, "interference contact" is meant to describe physical contact between two objects in which one of the objects is compressed, deformed, or otherwise displaced by the other (i.e., more than mere touching).

As shown in FIGS. 4, 6, 7, and 8, optical fiber cables 10 may optionally include a water-swellable element 14 (i.e., a water-blocking material) positioned adjacent to the inner wall of the buffer tube 16 between the optical fiber element 12 and the inner wall of the buffer tube 16. As noted, the water-swellable element 14 helps to block the ingress of water into the core of the optical fiber cable 10 or, if water intrusion occurs, helps to prevent the movement of water along the length of the optical fiber cable 10. Also as noted, the water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

Additionally, reinforcing rods (not shown) may be included to provide supplemental stiffness to the buffer tube 16, thereby inhibiting bending. The reinforcing rods, for instance, may be incorporated within the structure of the buffer tube 16. As will be known by those having ordinary skill in the art, reinforcing rods may be formed from glass-reinforced plastic. In this regard, exemplary glass-reinforced plastic (GRP) might include between about 80 and 90 weight percent glass.

In accordance with the foregoing, the thickness of the coupling element 18 is sized relative to the optical fiber element 12 so as to leave a gap within the buffer tube 16 (e.g., between the optical fiber element 12 and the other elements that make up the optical fiber cable 10). Those having ordinary skill in the art will recognize that a gap around the entire perimeter of the optical fiber element 12 constitutes annular free space as herein described.

With reference to FIG. 4, the sum of the thicknesses of the elements positioned within the buffer tube 16 (i.e., the optical fiber element 12, the water-swellable element 14, and the coupling element 18) is less than the inside diameter of the buffer tube 16. This gap within the buffer tube 16 helps to reduce undesirable (and perhaps unnecessary) contact points, thereby controlling unnecessary contact pressures from being exerted on the optical fiber element 12. Accordingly, the coupling element 18 does not compress the optical fiber element 12 under most operational circumstances.

Additionally, the gap allows the optical fiber element 12 to move axially on a small, localized scale with respect to the buffer tube 16. This small-scale movement helps prevent the kinds of bunching of the optical fiber element 12 that can lead to microbending and macrobending. At the same time, though, the coupling provided by the coupling element 18 prevents substantial lengthwise movement of the optical fiber element 12 within the buffer tube 16.

Figure 12:
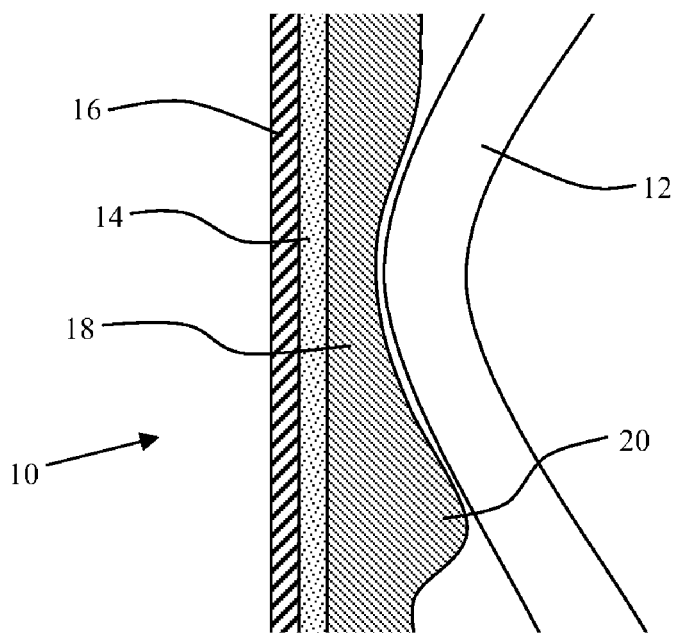
FIG. 12 depicts a partial sectional view of an inner wall of the optical fiber cable in which a substantially incompressible coupling composition according to the present invention is deformed into a shelf-like structure.

FIG. 12 depicts a partial sectional view of the inner wall of the optical fiber cable 10 according to the present invention along line 4-4 of FIG. 11. FIG. 12 likewise illustrates the inner wall of the optical fiber cable 10 according to the present invention (and as depicted, for instance, in FIGS. 4, 6, and 7). A buffer tube 16 surrounds a water-swellable element 14, which in turn surrounds a coupling element 18, which is formed from the foregoing coupling composition (e.g., a blend of super-high molecular weight elastomeric block polymers and synthetic polyalphaolefin oil). These layers enclose an optical fiber element 12 to form the optical fiber cable 10.

In particular, FIG. 12 illustrates the performance advantage provided by the coupling compositions according to the present invention. FIG. 12 depicts deformation of the coupling element 18, here in the form of a substantially incompressible cohesive gel, under forces applied by the optical fiber element 12 (e.g., interference contact). The material (i.e., the cohesive gel coupling composition) displaced by the imposition of the optical fiber element 12 into the deformable profile of the coupling element 18 temporarily forms a protruding shelf-like structure 20, which can restrict axial movement of the optical fiber element 12 within the buffer tube 16. In this way, the coupling element 18 serves to dynamically couple the optical fiber element 12 to the buffer tube 16. (A coupling element 18 in the form of a foamed coupling composition will behave similarly.)

Figure 6:
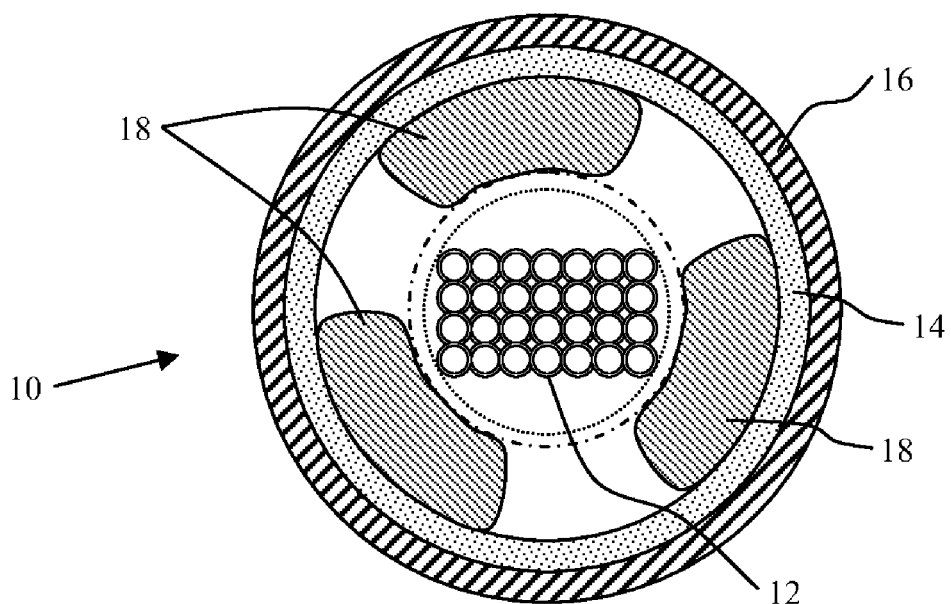
FIGS. 6, 7, 8, and 9 depict cross-sectional views of optical fiber cables in which the coupling composition according to the present invention defines annular free space about the respective optical fiber ribbon stacks.
Figure 7:
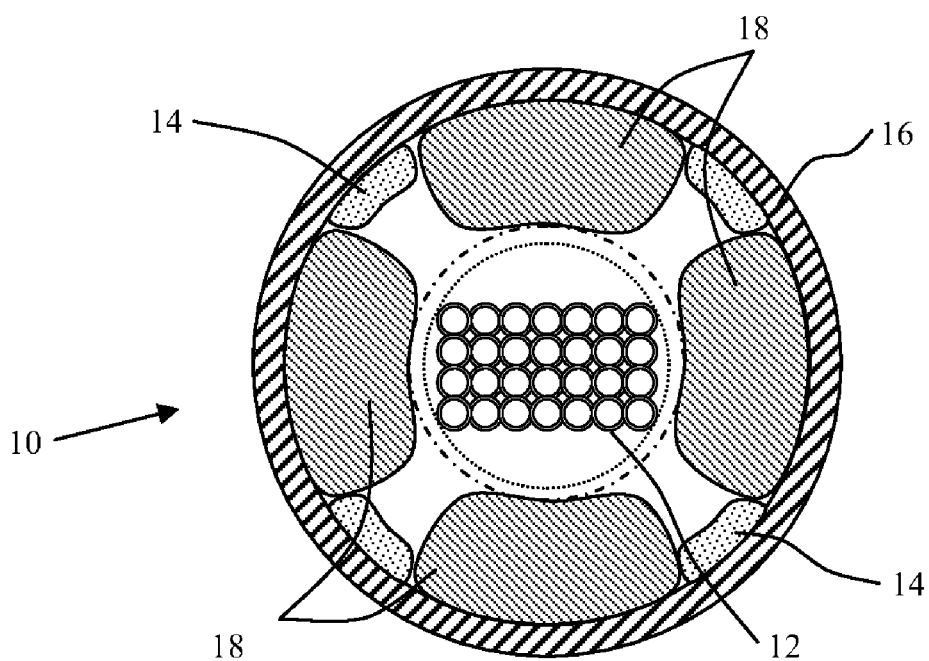

FIGS. 6 and 7 depict cross-sectional views of exemplary optical fiber cables 10 that include respective coupling elements 18 formed from the coupling composition of the present invention. In these particular optical fiber cable embodiments, the coupling element 18 includes multiple strips or beads of the coupling composition positioned intermittently around the optical fiber element 12. These particular embodiments are intended to illustrate the various cable configurations embraced by the present invention.

In particular, in the exemplary optical fiber cable embodiment depicted in FIG. 6, an optical fiber element 12 is disposed within a buffer tube 16. A water-swellable element 14 is positioned adjacent to the inner wall of the buffer tube 16 between the optical fiber element 12 and the inner wall of the buffer tube 16. Three strips of the coupling composition, working together as a coupling element 18, are intermittently positioned adjacent to the optical fiber element 12 between the optical fiber element 12 and the water-swellable element 14.

In the exemplary optical fiber cable embodiment depicted in FIG. 7, an optical fiber element 12 is likewise disposed within a buffer tube 16. Here, however, alternating strips (or beads) of a coupling element 18 (formed from the coupling composition) and a water-swellable element 14 are positioned adjacent to the inner wall of the buffer tube 16 between the optical fiber element 12 and the inner wall of the buffer tube 16.

Figure 8:
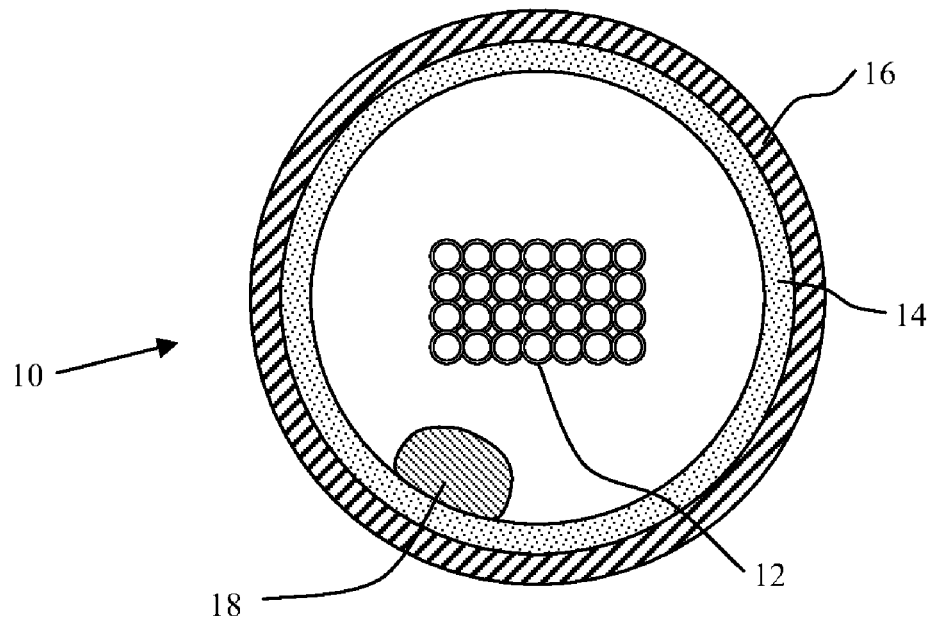
Figure 9:
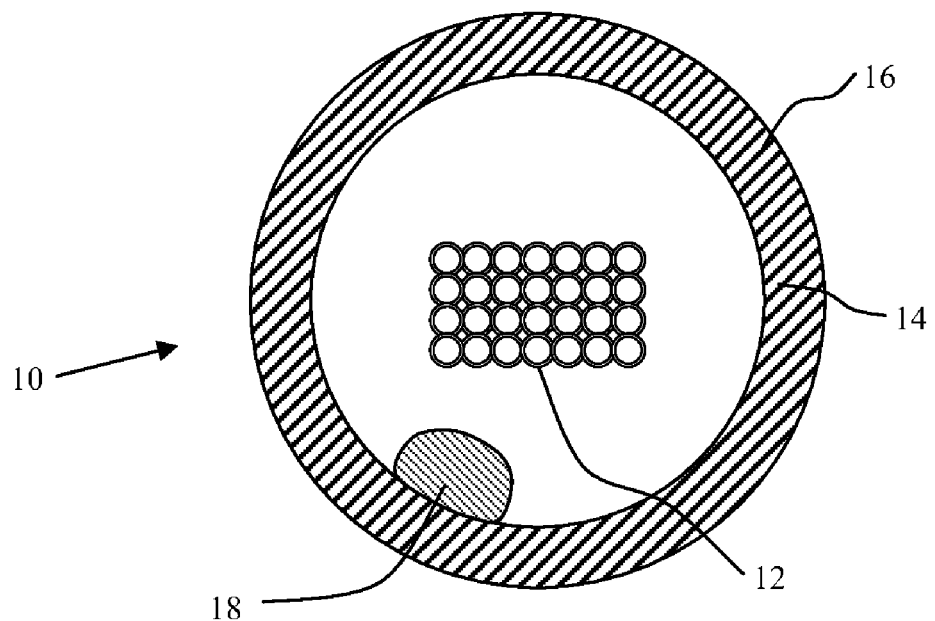

In other exemplary optical fiber cable embodiments depicted in FIGS. 8 and 9, the coupling element 18 is a strip (or bead) formed from the coupling composition, which may be a cohesive gel or a foam. The coupling element 18 is positioned between the optical fiber element 12 and the inner wall of the buffer tube 16.

As depicted in FIG. 8, the coupling element 18 and the water-swellable element 14 are positioned adjacent to the inner wall of the buffer tube 16 between the optical fiber element 12 and the inner wall of the buffer tube 16. (The optical fiber cable embodiment depicted in FIG. 9, of course, omits a water-swellable element 14.)

In either of these particular optical fiber cable embodiments, the coupling element 18 may be a continuous or an intermittent bead of the coupling composition positioned along the length of the optical fiber element 12 (e.g., configured in a straight or helical strip). Those having ordinary skill in the art will appreciate that, in such single-bead configurations, the coupling composition provides somewhat less protection to the optical fiber element 12, but provides adequate coupling of the optical fiber element 12 to the buffer tube 16.

As noted previously, according to this optical fiber cable embodiment, the coupling element 18 should be configured and sized to retain a gap between the coupling element 18 and the optical fiber element 12—at least for some discrete segments along the optical fiber cable 10. In other words, the optical fiber element 12 should be capable of being positioned within the buffer tube 16 in a way that does not require contact with the coupling element 18 (i.e., capable of defining annular free space).

In a variation on this optical fiber cable embodiment, at any given cable cross-section that includes the coupling element 18, the coupling element 18 provides coupling area for the optical fiber element 12. See FIG. 4 (depicting a coupling space cross-section). In this regard, the concept of "nominal coupling diameter" is used herein to characterize free area available to the optical fiber element 12 within the inner region of the optical fiber cable 10 (e.g., within the coupling element 18 and the buffer tube 16).

Figure 13:
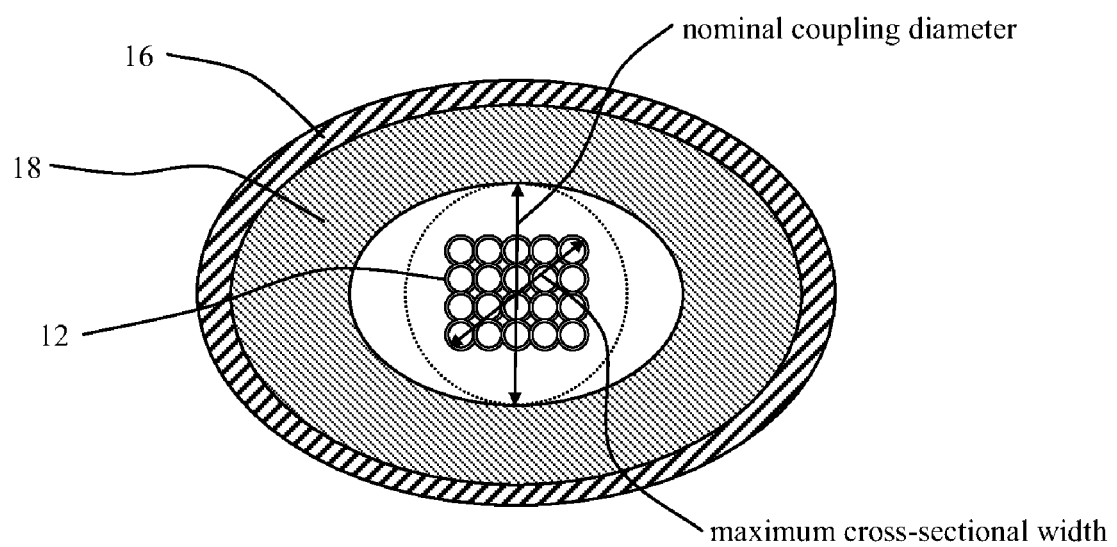
FIG. 13 depicts, for example, an elliptical optical fiber cable, the nominal coupling diameter of a coupling element formed from the coupling composition according to the present invention and the maximum cross-sectional width of the optical fiber ribbon stack.

In particular, as used herein, the term "nominal coupling diameter" describes, at any given cable cross-section that includes the coupling element 18, the diameter of the largest circular cross-section (i.e., circle) that fits within the inner area defined by the coupling element 18 (and the buffer tube 16 or other surrounding cable components) without touching the coupling element 18. See FIG. 13. Furthermore and as used herein, a cable cross-section that does not include (i.e., intersect or otherwise traverse) the coupling element 18 does not define a nominal coupling diameter.

Likewise, the optical fiber element 12 defines a maximum cross-sectional width. As used herein, the term "maximum cross-sectional width" is meant to characterize the largest cross-sectional dimension of the optical fiber element 12. For example, for an optical fiber bundle having a circular cross-section, the maximum cross-sectional width is simply the diameter of the circle it defines.

By way of further example and in view of the foregoing, a rectangular ribbon stack according to the present invention may be formed with or without a central twist (herein referred to as a "primary twist"). Those having ordinary skill in the art will appreciate that a ribbon stack is typically manufactured with rotational twist to ensure that its constituent optical fibers travel the same distance during cable winding (and subsequent bending). In either instance (i.e., with or without twist), the maximum cross-sectional width of the ribbon stack is simply its diagonal length. See FIG. 13.

In accordance with one particular embodiment of the optical fiber cable 10, at one or more cross-sections of the optical fiber cable 10, the nominal coupling diameter of the coupling element 18 is sized so that it exceeds the maximum cross-sectional width of the optical fiber element 12. In other words, along the length of the optical fiber cable 10 there is at least one cross-section in which the coupling element 18 is sized such that the optical fiber element 12 can be positioned (e.g., configured) within the buffer tube 16 (and adjacent to the coupling element 18) without contacting the coupling element 18. This particular embodiment may facilitate the use of the coupling composition in the form of a cohesive gel and/or a foam.

In accordance with another particular embodiment of the optical fiber cable 10, at any cross-section of the optical fiber cable 10, the nominal coupling diameter of the coupling element 18 is sized so that it exceeds the maximum cross-sectional width of the optical fiber element 12. Stated otherwise, this particular embodiment describes an optical fiber cable 10 in which the optical fiber element 12 is capable of defining annular free space within the entire length of the optical fiber cable 10 (i.e., capable of contact-free placement). This particular embodiment likewise facilitates the use of the coupling composition in the form of a cohesive gel and/or a foam.

Those having ordinary skill in the art will appreciate that in this particular embodiment the optical fiber element 12 is never squeezed or otherwise subjected to compressive forces within the coupling element 18 at any point along the length of the optical fiber cable 10. In other words, the coupling element 18 protrudes into the buffer tube 16 toward the optical fiber element 12, but does not create forced contact with the optical fiber element 12. See e.g., FIGS. 4 and 13.

More generally, in the foregoing exemplary optical fiber cable embodiments, the coupling element 18 does not completely fill the region between the inside wall of the buffer tube 16 and the optical fiber element 12.

In yet another particular optical fiber cable embodiment, the buffer tube 16 and coupling element 18 are sized such that, along a segment of the optical fiber cable 10 (e.g., over a meaningful length), the coupling element 18 defines a continuum of nominal coupling diameters, the average of which is greater than the maximum cross-sectional width of the optical fiber element 12.

The buffer tube 16 and coupling element 18 may further be sized such that, along a segment of the optical fiber cable 10, the minimum nominal coupling diameter of the coupling element 18 is greater than the maximum cross-sectional width of the optical fiber element 12. In other words, the maximum cross-sectional width of the optical fiber element 12 does not exceed or equal the clearance provided by (i.e., within) the coupling element 18 for that segment of the optical fiber cable 10. In this way, the coupling element 18 never causes any squeeze coupling or squeeze contact of the optical fiber element 12 along the particular segment of the optical fiber cable 10.

Moreover, in this particular embodiment, which provides annular free space along an entire segment of the optical fiber cable 10, the coupling element 18 can be partially compressible. For instance, to the extent it is sized so as to preclude squeeze contact with the optical fiber element 12, the coupling element 18 might be deformable yet substantially incompressible adjacent to the optical fiber element 12 (i.e., the innermost portion of the coupling element 18 where dynamic coupling of the optical fiber element 12 occurs) yet compressible opposite the optical fiber element 12. In this regard, the coupling element 18 may be formed at least in part using foam. Where foam is employed, however, it provides uncompressed cushioning of the static optical fiber element 12.

In either configuration, interference contact of the optical fiber element 12 creates a shelf-like protrusion 20 in the coupling element 18. This shelf-like protrusion 20 resists axial movement of the optical fiber element 12 with respect to the buffer tube 16. See e.g., FIG. 12.

Figure 14:
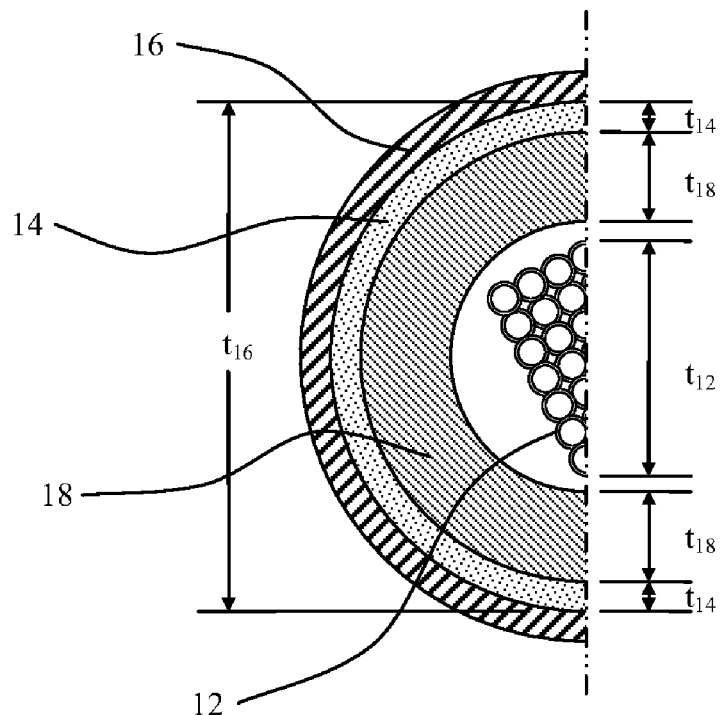
FIG. 14 depicts an exemplary optical fiber cable in which the inner diameter of the buffer tube is greater than the combined thicknesses of all elements positioned within the buffer tube (i.e., the water-swellable element, the coupling element, and the optical fiber element).

In these particular optical fiber cable embodiments, the components of the optical fiber cable 10 are designed to ensure that the optical fiber element 12 is not squeezed or otherwise subjected to compressive forces within the coupling element 18. As illustrated in FIG. 14, for a buffer tube 16 having a specified inner diameter, the coupling element 18 should be thin enough such that the inner diameter of the buffer tube 16 is greater than the combined thicknesses of all elements within the buffer tube 16. For example, the sum of twice the thickness of the coupling element 18 (i.e., $t_{18}$), twice the thickness of any other layers within the buffer tube 16 (e.g., a water-swellable element 14), and the maximum cross-sectional width of optical fiber element 12 (i.e., $t_{12}$) should be less than the inner diameter of the buffer tube 16 (i.e., $t_{16}$). See FIG. 14. (Those having ordinary skill in the art will recognize that the thicknesses of the coupling element 18 and other layers within the buffer tube 16 are accounted for twice because these elements encircle the optical fiber element 12.)

In a structural variation, a twisted (or untwisted) rectangular ribbon stack may be further formed into a coil-like or a wave-like configuration (i.e., having regular "secondary" deformations). For any optical fiber element 12, these secondary configurations define an "effective maximum width."

For example, a rectangular ribbon stack may be formed into a helical configuration (i.e., a helix) in which the outermost diameter defined by the helix (i.e., its "effective maximum width") exceeds the maximum cross-sectional width of the rectangular ribbon stack. Similarly, a rectangular ribbon stack may be formed into a wave-like configuration (e.g., sinusoidal) in which the peak-to-trough measurement (i.e., its "effective maximum width" is twice its amplitude) exceeds the maximum cross-sectional width of the rectangular ribbon stack.

Accordingly, in another particular optical fiber cable embodiment, the optical fiber element 12 is configured to have regular secondary deformations such that its effective maximum width exceeds its maximum cross-sectional width. Moreover, in this particular embodiment, the nominal coupling diameter of the coupling element 18 is typically sized so that it exceeds the effective maximum width of the optical fiber element 12.

By way of further illustration, a twisted rectangular ribbon stack may be formed into a helical configuration such that (i) the maximum cross-sectional width of the optical fiber element 12 is less than its effective maximum width and (ii) the effective maximum width of the optical fiber element 12 is less than the nominal coupling diameter of the coupling element 18. Stated otherwise, the optical fiber element 12 (having primary twists and configured into a helix) can be positioned within the buffer tube 16 (and adjacent to the coupling element 18) such that the twisted and helical optical fiber element 12 is not in contact with the coupling element 18.

In accordance with the foregoing, in this alternative structure, the coupling element 18 provides space to account for any regular eccentric movement (e.g., helical coiling) of the optical fiber element 12 within the buffer tube 16. That is, the coupling space within the buffer tube 16 (and the coupling element 18) should accommodate the effective maximum width of the optical fiber element 12.

More typically, a twisted (or untwisted) rectangular ribbon stack may assume irregular "secondary" deformations (e.g., irregular coiling) during use (e.g., installation). Accordingly, the nominal coupling diameter of the coupling element 18 can be sized so that the coupling element 18 facilitates coupling of the optical fiber element 12 when detrimental levels of excess length occur within optical fiber cable 10. The design considerations of the optical fiber cable 10 should balance, in effect, the extremes of excess length and interference contact between the optical fiber element 12 and the coupling element 18. As noted, this is principally controlled by ensuring that at one or more cross-sections of the optical fiber cable 10, the nominal coupling diameter of the coupling element 18 is sized so that it exceeds the maximum cross-sectional width of the optical fiber element 12.

Whether its secondary deformations are regular or irregular, the optical fiber element 12 typically rests on the coupling element 18 at discrete locations along the length of the optical fiber cable 10 (i.e., optical fiber element 12 most typically does not contact the coupling element 18 along the entire length of the optical fiber cable 10). These interference contacts are sufficient to support the optical fiber element 12 within the buffer tube 16. In this way, the optical fiber element 12 can move relative to the buffer tube 16 to account for the differences in the thermal expansion or contraction of the different constituent materials.

By way of example, when the buffer tube 16 contracts relative to the optical fiber element 12 due to thermal contraction or bending of the optical fiber cable 10, the difference in length between the buffer tube 16 and the optical fiber element 12 is known as "excess length." When excess length develops in the optical fiber element 12, the optical fiber element 12 may coil or bend, thereby creating interference contact with the coupling element 18. Upon such contact, the coupling element 18 supports the optical fiber element 12 by deforming to create a shelf-like protrusion 20. In response to the application of such an interference force, the coupling element 18 resists axial movement of the optical fiber element 12 within the buffer tube 16.

For instance and as noted, various conditions may cause excess length in the optical fiber element 12 to bunch, slump, gather, or otherwise collect in a small section of the buffer tube 16. For instance, for an optical fiber cable 10 oriented vertically, gravity tends to cause excess length in the optical fiber element 12, the excess length typically collecting near the bottom of the optical fiber cable 10.

Likewise, in optical fiber cables 10 that contract after having been stretched during installation or thermally expanded, the component optical fiber element 12 may tend to bunch. As depicted in FIG. 12, the coupling element 18, which (at least adjacent to the optical fiber element 12) is formed from the cohesive gel coupling composition according to the present invention, resists these tendencies of the optical fiber element 12 to slump by deforming to create a shelf-like protrusion 20 wherever interference contact between the optical fiber element 12 and the coupling element 18 occurs.

As will be appreciated by those having ordinary skill in the art, the coupling element 18 may embrace various forms to effectively couple the optical fiber element 12 to the buffer tube 16. For instance, in the particular optical fiber cable embodiment depicted in FIG. 4, the coupling element 18 may completely encircle the optical fiber element 12 (i.e., a circumferentially continuous layer). By completely surrounding the optical fiber element 12, this configuration ensures the buffer tube 16 and any components within the buffer tube 16 cannot exert a microbending-inducing force or macrobending-inducing force on the optical fiber element 12.

Figure 5:
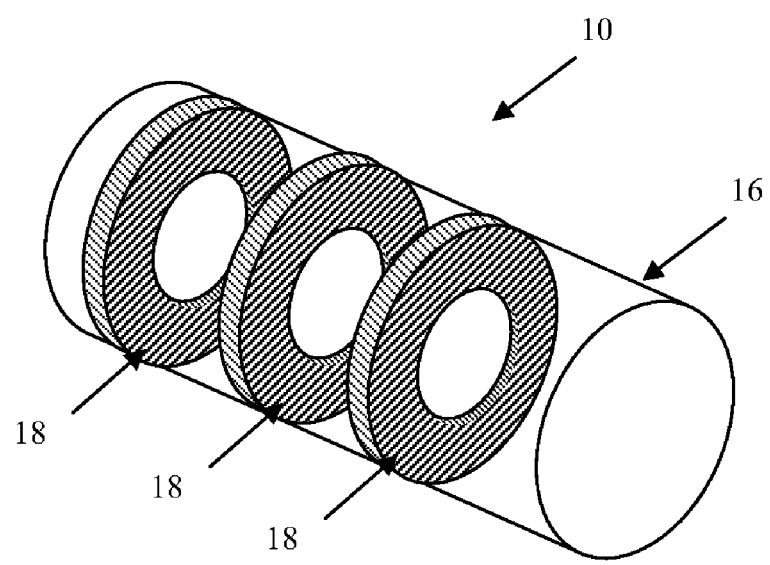
FIG. 5 depicts a perspective view of an optical fiber cable in which the coupling composition according to one embodiment of the present invention is intermittently spaced along the length of the optical fiber cable. (For clarity, this figure omits the respective optical fiber element.)

The circumferentially continuous layer may be lengthwise-continuous, too, to ensure that coupling can be achieved at any point along the length of the optical fiber cable 10. Alternatively, the circumferentially-continuous layer may instead be intermittently spaced along the length of the optical fiber cable 10. See FIG. 5. To account for the often non-linear orientation of the optical fiber element 12 within the buffer tube 16, the resulting intermittent rings of coupling material should be spaced closely enough to effectively engage the optical fiber element 12 regardless of how the optical fiber element 12 twists or bends within the buffer tube 16. This configuration reduces the amount of material used to form the coupling element 18 yet maintains sufficient coupling of the optical fiber element 12 to the buffer tube 16.

Furthermore, in the particular optical fiber cable embodiments depicted in FIGS. 6 and 7, the coupling element 18 may be provided as a plurality of strips or beads of the coupling composition spaced around the perimeter of the optical fiber element 12 (i.e., circumferentially discontinuous). The number and spacing of the strips of material should be sufficient to effectively engage the optical fiber element 12 regardless of the orientation of the optical fiber element 12. Stated differently, the gaps between the intermittent strips should not be so great as to readily permit an irregularly coiled optical fiber element 12 to become positioned between the strips and, possibly, to contact the water-swellable element 14 or the buffer tube 16. In this configuration, less material is used to form the coupling element 18 but the coupling element 18 nonetheless provides adequate coupling of the optical fiber element 12 to the buffer tube 16.

In this circumferentially-discontinuous variation, the strips or beads of the coupling composition may be provided as lengthwise-continuous strips that provide uniform coupling at any point along the length of the optical fiber cable 10. Alternatively, the strips or beads may be lengthwise-discontinuous (e.g., segments of the coupling composition), using only so much material as is necessary to provide the desired coupling and fiber protection.

In conjunction with these circumferentially-discontinuous alternatives, the water-swellable element 14 may be provided as water-swellable strips (e.g., yarns containing water-swellable material). As depicted in FIG. 7, the water-swellable strips may be positioned between the lengthwise strips of the coupling material. This configuration uses less water-swellable materials to perform the desired water-blocking function. Further, by alternating the water-swellable element 14 and coupling element 18 about the inner surface of the buffer tube 16 rather than stacking the elements on top of each other, thinner buffer tubes may be constructed while retaining significant coupling and water-blocking functions.

The coupling element 18 can be formed and/or configured within the buffer tube 16 in various ways. For example, the coupling composition may be extruded onto the buffer tube 16 (or onto the water-swellable element 14, if present) to form the coupling element 18 so as to at least partially surround the optical fiber element 12.

In this regard, in one particular embodiment, the coupling composition may be co-extruded with the buffer tube 16 to not only surround the optical fiber element 12 but also bond the coupling element 18 and the buffer tube 16 together. Further, the coupling element 18, water-swellable element 14, and buffer tube 16 may all be extruded together.

In another particular embodiment, the coupling element 18 may be formed separately from the buffer tube 16 and subsequently secured to the buffer tube 16 such as by frictional coupling, by thermal bonding, or by adhesive bonding. For instance, a thermoplastic or thermoset adhesive may be applied to couple the coupling element 18 and the buffer tube 16.

As discussed previously, the coupling element 18 is formed of the coupling composition according to the present invention. As noted, the coupling composition is typically a blend of an elastomeric block copolymer and a synthetic polyalphaolefin oil. In a particular embodiment, the coupling element 18 possesses water-blocking characteristics, thereby reducing if not eliminating the need for a separate water-swellable element 14. This may be achieved, for instance, by employing the coupling composition as a cohesive gel or a closed-cell foam.

For instance, the coupling element 18 might be formed from a coupling composition that is enhanced with water-swellable materials (e.g., a blend of water-swellable polymers and non-water-swellable polymers). In this regard, exemplary water-swellable materials include a matrix (e.g., ethylene vinyl acetate or rubber) enhanced with about 30-70 weight percent super absorbent polymers (SAPs), such as particulates of sodium polyacrylate, polyacrylate salt, or acrylic acid polymer with sodium salt. Such water-swellable materials can be processed on conventional hot melt adhesive machinery. An exemplary water-swellable material, which can be further blended with the blend of elastomeric block copolymers and synthetic polyalphaolefin oil, is available from the H.B. Fuller Company under the trade name HYDROLOCK.

Alternatively, the coupling element 18 can be enhanced with water-swellable particulate powders, which can be bound, for instance, to the surface of the coupling element 18, usually opposite the optical fiber element 12 to reduce the risk of optical attenuation (e.g., microbending) or glass degradation. Such powders are typically composed of super absorbent polymers (SAPs) that, when bound on or impregnated in the coupling element 18, are dry to the touch and, accordingly, are readily removed from cables during splicing operations. Moreover, the water-swellable particulate powders can be applied to the outer surface of the coupling element 18 (i.e., opposite the optical fiber element 12), either completely or partially (e.g., intermittently).

One or more of the foregoing structural and process embodiments are disclosed in U.S. Provisional Patent Application Ser. No. 60/946,744, for Optical Fiber Cable Having a Deformable Coupling Element (filed Jun. 28, 2007) and U.S. patent application Ser. No. 12/146,526, for Optical Fiber Cable Having a Deformable Coupling Element (filed Jun. 26, 2008), each of which is hereby incorporated by reference in its entirety.

In yet another optical fiber cable embodiment, a coupling element 18 is sized and positioned within a buffer tube 16 to provide coupling space sufficient to allow localized movement of an optical fiber element 12 within the buffer tube 16 but to prevent forced contact of the optical fiber element 12 to the buffer tube 16. As disclosed previously, the coupling element 18 may be, for instance, a blend of elastomeric block copolymers and synthetic hydrocarbon oil (e.g., polyalphaolefin oil).

In contrast to other optical fiber cable embodiments, the coupling element 18 is secured to the optical fiber element 12 rather than to the buffer tube 16. In other words, the optical fiber element 12 is embedded (fully or partially) within the coupling element 18 such that there is limited free space, if any, between the optical fiber element 12 and the coupling element 18. Instead, free space is formed between the coupling element 18 and the buffer tube 16 around the perimeter of the optical fiber element 12 (i.e., "annular free space").

Figure 15:
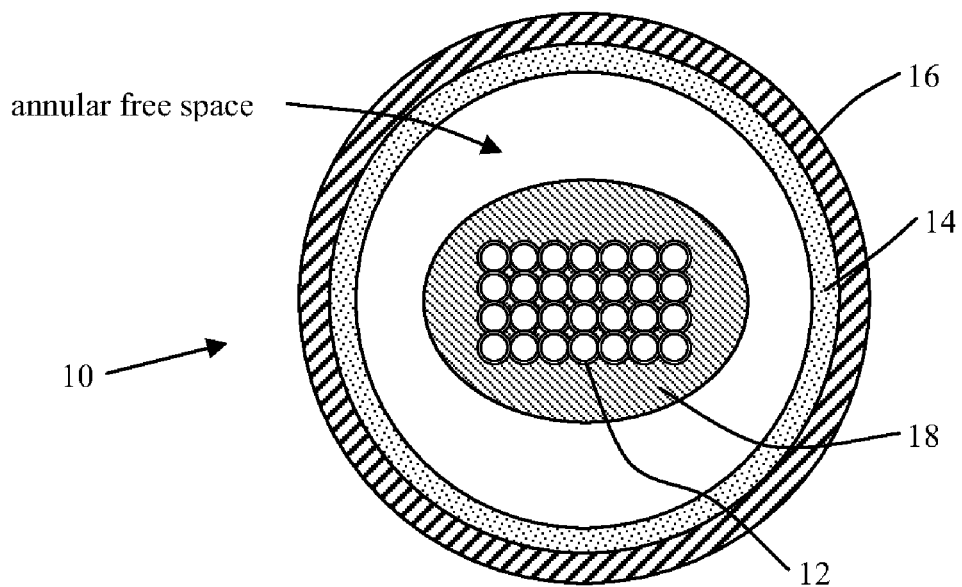
FIGS. 15 and 16 depict cross-sectional views of optical fiber cables in which respective optical fiber ribbon stacks are fully or partially embedded within the coupling composition according to the present invention to define free space within the buffer tube.

FIG. 15 depicts a cross-sectional view of one such embodiment of an optical fiber cable 10. Those having ordinary skill in the art will recognize that the coverage of the coupling composition upon the optical fiber element 12 need not be complete so long as the coverage is sufficient to restrict contact between the optical fiber element 12 and the buffer tube 16. Such an embodiment of the optical fiber cable 10 can be achieved by extruding the coupling composition directly on and around the optical fiber element 12, and then placing the resulting coupling element 18 and embedded optical fiber element 12 into a buffer tube 16. See also FIG. 2 (substantially complete filling of the buffer tube 16).

For example, the coupling element 18 and the embedded optical fiber element 12 can be inserted into a pre-extruded, pre-slit buffer tube 16 (e.g., using a "plow" device to open the pre-slit buffer tube to facilitate the insertion of the embedded optical fiber element 12). As noted, the exact levels of excess optical fiber length (EFL)/excess ribbon length (ERL) are achieved by controlling the tension in both the buffer tube and the optical fiber element 12 during this insertion step into the pre-slit buffer tube. If deemed necessary, a tape can then be applied over the buffer tube slit, or the slit can be welded closed. With the extruded coupling composition directly on and around the optical fiber element, however, it is likely that no additional protection is necessary.

Alternatively, the embedded optical fiber element 12 might be blown or pushed (e.g., jetted) into the buffer tube 16, at least over moderate distances.

The optical fiber cable 10 may further include a water-swellable element 14 positioned adjacent to the inner wall of the buffer tube 16 between the coupling element 18 and the inner wall of the buffer tube 16. As before, the water-swellable element 14 helps to block the ingress of water into the core of the optical fiber cable 10 or, if water intrusion occurs, helps to prevent the movement of water along the length of the optical fiber cable 10. Also as before, the water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

This optical fiber cable 10 may be constructed by extruding the coupling element 18 onto the optical fiber element 12 to form an optical fiber "core." The buffer tube 16 may then be extruded around the "core," leaving annular free space between the buffer tube 16 and the optical fiber "core." The extrusion of the buffer tube 16 about the optical fiber element 12 and coupling element 18 may be performed concurrently with (i.e., co-extrusion) or after the step of extruding the coupling element 18 onto the optical fiber element 12.

This optical fiber cable design allows the optical fiber element 12 to move axially on a localized scale. As a result, this configuration accommodates changes in the length of the optical fiber element 12 relative to the buffer tube 16 (e.g., as a result of thermal contraction of the buffer tube 16) by providing room for excess length. In other words, the free space in the cable design allows the optical fiber cable 10 to bulge or otherwise move axially within the buffer tube 16.

Movement of the optical fiber element 12 on a larger scale, however, if sufficient to force the optical fiber element 12 into contact with the inner wall of the buffer tube 16, is resisted by the coupling element 18 surrounding the optical fiber element 12. Specifically, because the coupling element 18 is formed of a deformable material, the coupling composition will conform to the shape of the inner wall of the buffer tube 16, thereby increasing the surface area of the coupling element 18 that contacts the buffer tube 16.

Those having ordinary skill in the art will appreciate that because the frictional force is related to the size of the contact area, an increase in contact area increases surface friction. As a result, large-scale movement of the optical fiber element 12 within the buffer tube 16 that causes the optical fiber "core" (i.e., the optical fiber element 12 and the surrounding coupling element 18) to contact the buffer tube 16 will be resisted frictionally by the coupling element 18. Further, at points where the optical fiber "core" contacts the inner wall of the buffer tube 16, the coupling element 18 cushions the optical fiber element 12 against the resulting force.

The coupling element 18 may be positioned within the buffer tube 16 in various ways to provide the protection of the optical fiber element 12 and to couple the optical fiber element 12 to the buffer tube 16. For instance, the coupling element 18 may completely encircle the optical fiber element 12 (i.e., a circumferentially continuous layer shown in FIG. 15). By completely surrounding the optical fiber element 12, this configuration ensures the buffer tube 16 and any components within the buffer tube 16 cannot exert a microbending-inducing force or macrobending-inducing force on the optical fiber element 12.

The circumferentially continuous layer may be lengthwise-continuous, too, to ensure that coupling can be achieved at any point along the length of the optical fiber cable 10. Alternatively, the circumferentially-continuous layer may instead be intermittently spaced along the length of the optical fiber cable 10. To account for the often non-linear orientation of the optical fiber element 12 within the buffer tube 16, the resulting intermittent rings of coupling material should be spaced closely enough to effectively couple the optical fiber element 12 to the buffer tube 16, regardless of how the optical fiber element 12 twists or bends within the buffer tube 16. This configuration reduces the amount of material used to form the coupling element 18 yet maintains sufficient coupling of the optical fiber element 12 to the buffer tube 16.

Figure 16:
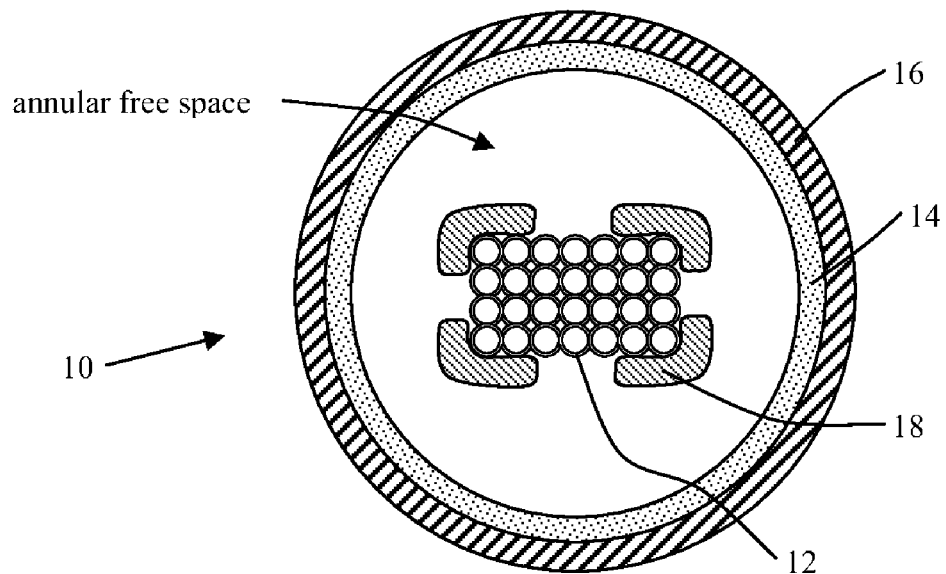

Furthermore, as depicted in FIG. 16, the coupling element 18 may be provided as a plurality of strips or beads of the coupling composition spaced around the perimeter of the optical fiber element 12 (i.e., circumferentially discontinuous). The number and spacing of the strips of material should be sufficient to allow the optical fiber "core" to effectively engage the buffer tube 16 regardless of the orientation of the optical fiber element 12. Stated differently, the gaps between the intermittent strips should not be so great as to readily permit the optical fiber element 12 to contact the water-swellable element 14 or the buffer tube 16. In this configuration, less material is used to form the coupling element 18, but the coupling element 18 nonetheless provides adequate coupling of the optical fiber element 12 to the buffer tube 16.

In this circumferentially-discontinuous variation, the strips or beads of the coupling composition may be provided as lengthwise-continuous strips that provide uniform coupling at any point along the length of the optical fiber cable 10. Alternatively, the strips or beads may be lengthwise-discontinuous (e.g., segments of the coupling composition), using only so much material as is necessary to provide the desired coupling and fiber protection.

Finally, in accordance with the foregoing, cable embodiments in which the optical fiber element 12 is partially or fully embedded within the coupling element 18 are well-suited to an application of water-swellable particulate powders to the outer surface of the coupling element 18 (i.e., opposite the optical fiber element 12). In general and as noted, including water-swellable particulate powders in or on the coupling element 18 may reduce or even eliminate the need for a separate water-swellable element 14. See FIG. 15 and FIG. 16.

In yet another optical fiber cable embodiment, a coupling element 18 is secured to both an optical fiber element 12 and a buffer tube 16 enclosing the optical fiber element 12. In other words, the optical fiber element 12 is embedded (fully or partially) within the coupling element 18 such that there is limited free space, if any, between the optical fiber element 12 and the coupling element 18. In contrast to the preceding embodiments of the optical fiber cable 10, at least some portions of the coupling element 18 are secured to the buffer tube 16.

Figure 17:
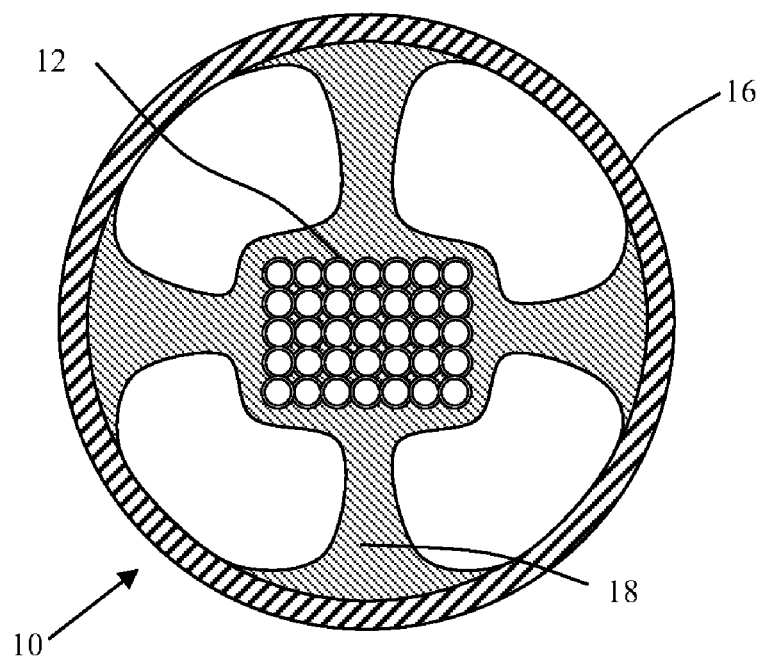
FIG. 17 depicts a cross-sectional view of another optical fiber cable in which the coupling composition according to the present invention defines free space within the buffer tube.

As depicted in FIG. 17, the coupling element 18 is secured to both the optical fiber element 12 and the buffer tube 16, yet free space is provided between the coupling element 18 and the buffer tube 16 (i.e., where the two elements are not connected).

Again, the coupling element 18 may be formed from the coupling composition according to the present invention. For instance, the coupling element 18 may be formed from a coupling composition that is a blend of super-high molecular weight elastomeric block copolymers (e.g., SEBS) and synthetic hydrocarbon oil having (i) a pour-point of less than about −15° C. and an absorbability in polyethylene and/or polypropylene of less than about 5 percent or (ii) a pour-point of less than −35° C. and an absorbability in polyethylene and/or polypropylene of less than about 15 percent.

The optical fiber cable 10 according to this embodiment may be constructed by co-extruding the coupling element 18 and buffer tube 16 around the optical fiber element 12. The optical fiber cable 10 may further include a water-swellable element 14 (not shown) positioned adjacent to the inner wall of the buffer tube 16 in the areas of free space within the buffer tube 16. As noted, the water-swellable element 14 helps to block the ingress of water into the core of the optical fiber cable 10 or, if water intrusion occurs, helps to prevent the movement of water along the length of the optical fiber cable 10. Also as noted, the water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

In this optical fiber cable configuration, the optical fiber element 12 is secured within the buffer tube 16 to prevent large-scale movement of the optical fiber element 12 within the buffer tube 16. Because the coupling composition is elastic (e.g., possessing high elongation to break), the optical fiber element 12 is not rigidly secured to the buffer tube 16. Rather, the coupling element 18 may deform (e.g., stretch or compress) to allow the optical fiber element 12 to move on a localized scale. This novel cable structure is possible because of the superior performance of the present coupling composition as described herein.

The movement that is permitted may be adjusted by varying the thickness of the portions of the coupling element 18 that connect the optical fiber element 12 to the buffer tube 16 (i.e., the "tethers"). In this regard, more movement may be possible if thinner tethers are employed. The optical fiber element 12 may be allowed further ability to move if the tethers are not continuous along the length of the buffer tube 16. In other words, if the optical fiber element 12 is only coupled (i.e., "tethered") to the buffer tube 16 at discontinuous intervals along the length of the buffer tube 16, the optical fiber element 12 is given more freedom to move within the buffer tube 16. As a result, this configuration accommodates changes in the length of the optical fiber element 12 relative to the buffer tube 16 (e.g., as a result of thermal contraction of the buffer tube 16).

This optical fiber cable configuration also serves to protect the optical fiber element 12 from microbending and macrobending. Specifically, the portions of the coupling element 18 that connect the optical fiber element 12 to the buffer tube 16 resist not only the longitudinal movement of the optical fiber element 12 within the buffer tube 16 but also serve to resist radial movement of the optical fiber element 12 within the buffer tube 16. The coupling element 18 is configured to support the optical fiber element 12 at or near the center of the buffer tube 16. Although the elasticity of the coupling element 18 allows the optical fiber element 12 to move on a small scale, large positional deviations are resisted. Accordingly, the coupling element 18 helps to prevent the optical fiber element 12 from contacting the buffer tube 16.

In addition, at points where the "tethers" are deformed (e.g., stretched or compressed) to such a degree that the optical fiber element 12 would otherwise contact the inner wall of the buffer tube 16, the portion of the coupling element 18 surrounding the optical fiber element 12 cushions the optical fiber element 12 against the force of the contact. Accordingly, the coupling element 18 serves to reduce the likelihood that the optical fiber element 12 may come into damaging forced contact with the inner wall of the buffer tube 16.

Figure 18:
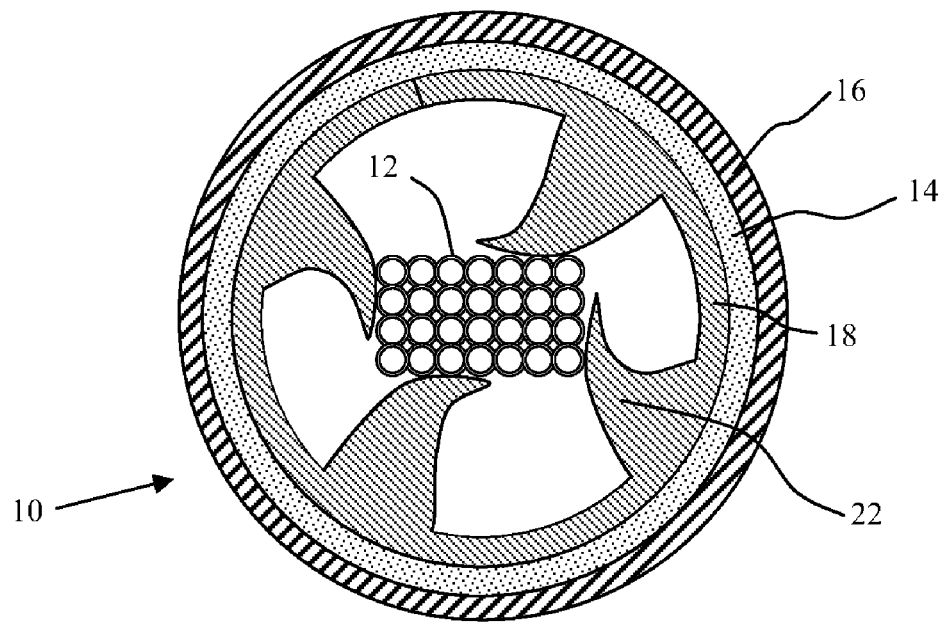
FIGS. 18, 19, and 20 depict cross-sectional views of optical fiber cables containing various optical fiber ribbon stacks and coupling elements formed from the coupling composition according to the present invention.

In yet another optical fiber cable embodiment, depicted in FIG. 18, an optical fiber element 12 is coupled within a buffer tube 16 by a coupling element 18 having a number of raised members 22. The optical fiber element 12 itself includes at least one optical fiber, typically a plurality of optical fibers (e.g., a ribbon stack). The optical fiber element 12 is typically manufactured with rotational twist. As with the other optical fiber cable embodiments, the coupling element 18 is formed of the coupling composition according to the present invention (e.g., the foregoing polymer/oil blends).

An exemplary coupling element 18 in accordance with this optical fiber cable embodiment is a coupling tape, though the coupling element 18 can be formed in-situ, such as via melt extrusion. As depicted in FIG. 18, the coupling element 18 includes raised members 22 (e.g., ridges, bumps, nubs, ribs, or spikes) that couple the optical fiber element 12 to the buffer tube 16. The raised members 22 of the coupling element 18 are configured (e.g., sized) to provide forced contact with the optical fiber element 12 sufficient to secure the optical fiber element 12 within the buffer tube 16. FIG. 18 (as well as FIGS. 19 and 20) show the deformation of the raised members 22 upon interference contact with the optical fiber element 12. Those having ordinary skill in the art will understand that the coupling element 18 is intended to embrace raised members 22 that are formed on one or more inserts or that are discrete from one another (e.g., extruded onto the inner wall of the buffer tube 16). See FIG. 19.

The use of a coupling element 18 having raised members 22 may better distribute the force needed to couple the optical fiber element 12 to the buffer tube 16. For example, a typical dry cable construction known in the art includes a layer of compressible material having a uniform thickness surrounding a ribbon stack (e.g., uniform cushioning layer) such that the compressible material squeezes the ribbon stack at its corners. As a result, the corner fibers (i.e., located at the corner positions) experience the force applied by the coupling material along the entire length of the cable. Having this coupling force consistently focused on the same individual optical fibers is thought to increase the likelihood of attenuation-causing macrobending or microbending.

In contrast, raised members 22 distributed about the ribbon stack will contact the ribbon stack wherever the raised members 22 are present, independent of the geometry of the ribbon stack. If the ribbon stack is twisted (as is typical in the industry), the coupling element 18 having this configuration contacts different optical fibers around the perimeter of the ribbon stack at different cross-sections of the optical fiber cable 10. Stated otherwise, the coupling element 18 may apply a force to an optical fiber positioned on the perimeter of the ribbon stack at some points along the length of the optical fiber cable 10, but it will not apply that force continually at every point along the length. This configuration thus helps to distribute the force applied by the raised members 22 to the optical fiber element 12 (and vice-versa) over the perimeter of the optical fiber element 12 instead of concentrating the compressive force on the corners of the ribbon stack (i.e., the corner fibers).

Additionally, a deformable coupling element 18 having raised members 22 can better accommodate optical fiber elements 12 of different dimensions. The thickness of conventional coupling foam must be specifically sized for the dimensions of the ribbon stack that is to be positioned within the buffer tube 16. Otherwise, the coupling foam may exert excessive force on the ribbon stack, which can cause microbending or macrobending, or it may fail to exert enough compressive force to provide frictional coupling.

In contrast, the raised members 22 of the present invention conform to the dimensions of the optical fiber element 12 carried within the optical fiber cable 10. In this way, the same kind of coupling element 18 (i.e., identical design and size) may be secured within different buffer tubes 16 to couple differently sized optical fiber elements 12.

Furthermore, in this optical fiber cable embodiment, a water-swellable element 14 (e.g., a water-blocking material) may also be positioned adjacent to the inner wall of the buffer tube 16 between the optical fiber element 12 and the inner wall of the buffer tube 16. See FIGS. 18 and 20.

Alternatively, the water-swellable element 14 may include water-swellable yarns (i.e., the water-swellable element 14) positioned between the raised members 22 of the coupling element 18. See FIG. 19. This configuration uses less water-swellable materials to perform the desired water-blocking function. Further, by alternating the water-swellable element 14 and coupling element 18 about the inner surface of the buffer tube 16 rather than stacking the elements on top of each other, thinner buffer tubes may be constructed while retaining significant coupling and water-blocking functions.

As noted, the water-swellable element 14 helps to block the ingress of water into the core of the optical fiber cable 10 or, if water intrusion occurs, helps to prevent the movement of water along the length of the optical fiber cable 10. Also as noted, the water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

Figure 19:
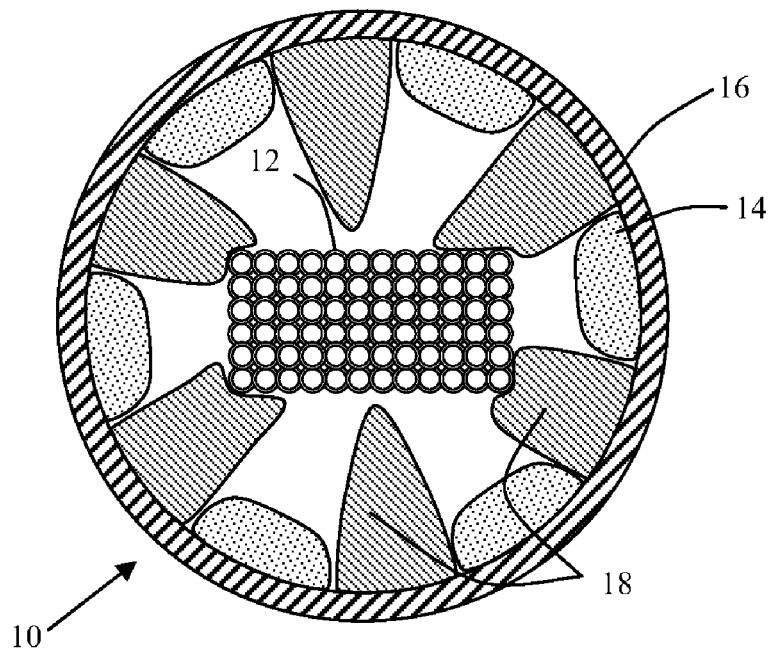
Figure 20:
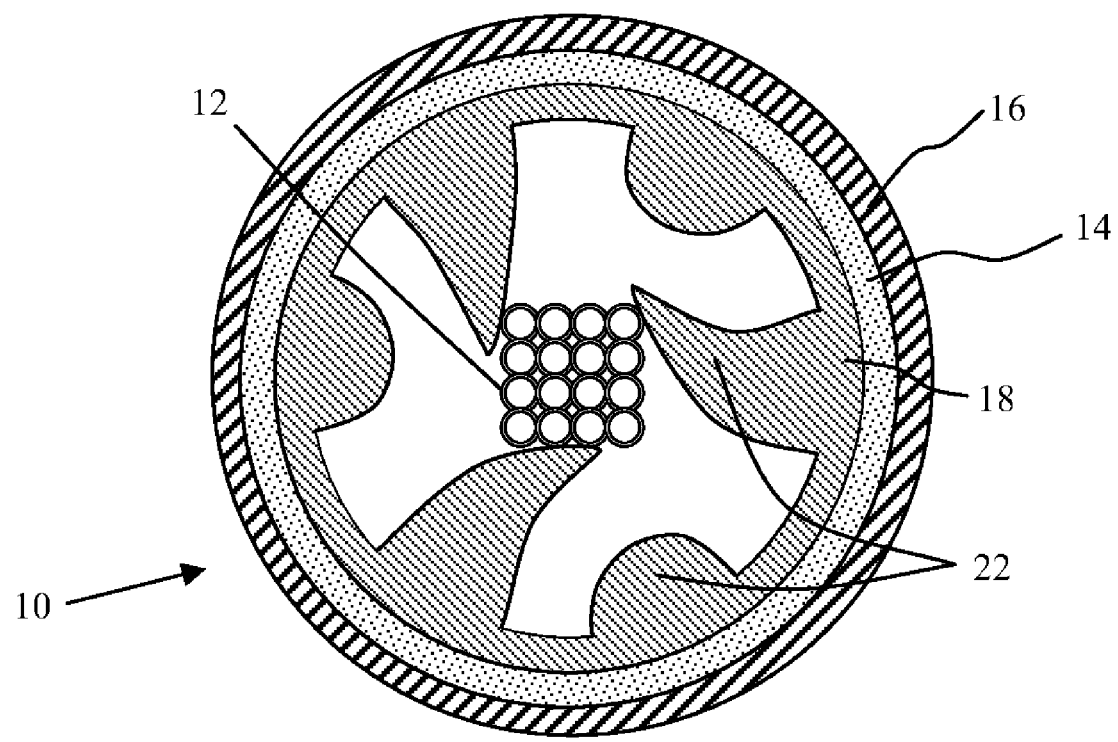
Figure 21:
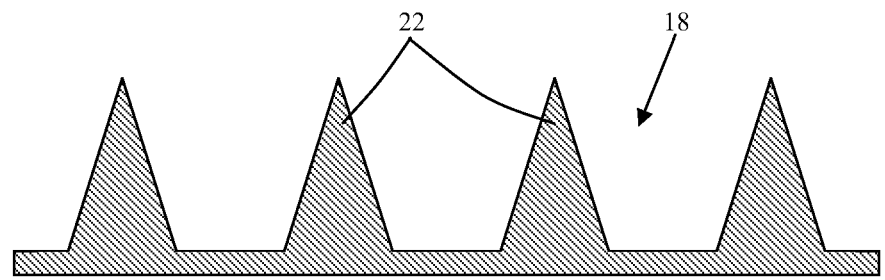
FIGS. 21, 22, 23, and 24 depict cross-sectional views of exemplary coupling elements formed from the coupling composition according to the present invention.
Figure 22:
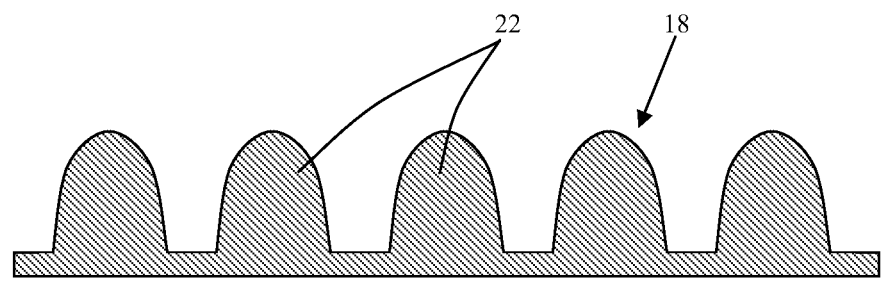
Figure 23:
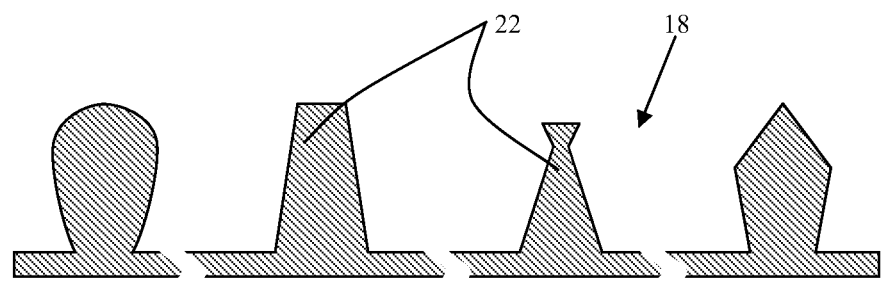

Those having ordinary skill in the art will appreciate that optical fiber cable embodiments like those depicted in FIGS. 18, 19, and 20, for instance, can each be employed with optical fiber ribbon stacks that are fully or partially embedded within the coupling composition of the present invention, such as depicted in FIGS. 15 and 16. In other words, the optical fiber element is protected by two distinct kinds of coupling elements.

Moreover, formulations of the coupling composition according to the present invention may be used both (i) to embed the optical fiber ribbon stacks fully or partially and (ii)

to couple the optical fiber ribbon stacks (and its surrounding material) by one or more raised members. In this regard and by way of example, the coupling composition directly surrounding the optical fiber ribbon stacks could be softer (or firmer) than the coupling composition that forms the raised member(s).

FIGS. 21, 22, 23, and 24 depict variations of the coupling element 18 formed from the coupling composition according to the present invention. In each depicted variation, the coupling element 18 incorporates several raised members 22 projecting from a substrate. Those having skill in the art will appreciate that the raised members 22 may be formed in a wide variety of shapes to couple the optical fiber element 12 to the buffer tube 16 (e.g., triangular, rectangular, semi-circular, trapezoidal, or pentagonal profile). See e.g., FIG. 23.

Figure 24:
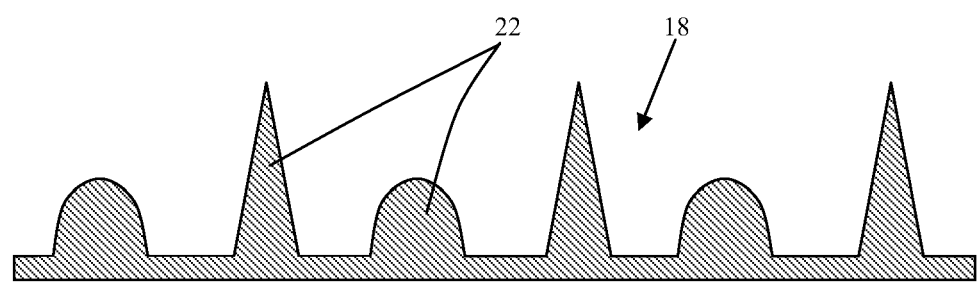

Further, raised members 22 having different shapes incorporated into a single coupling element 18 provide certain functional advantages. As depicted in FIGS. 20 and 24, the coupling element 18 includes alternating large (i.e., primary) and small (i.e., secondary) raised members 22 to provide varying degrees of coupling. In this illustrative coupling element embodiment, the primary raised members 22 provide the near-minimum contact needed to support the optical fiber element 12 within the buffer tube 16, but in circumstances in which greater coupling force is required (e.g., large-scale bending or excess length development), the secondary raised members 22 provide additional coupling support.

For example, if the optical fiber cable 10 is substantially bent, the primary raised members 22 might deform so much that one or more secondary raised members 22 come into interference contact with and thereby support the optical fiber element 12. The number, shape, and configuration of the raised members 22 should be designed to account for such considerations, but, at a minimum, the raised members 22 must effectively couple the optical fiber element 12 to the buffer tube 16. These design parameters, of course, will be specific to the needs of the optical fiber cable 10 but are within the abilities of those having ordinary skill in the art.

It should be noted that, regardless of the size or shape of the raised members 22 of the coupling element 18, raised members 22 formed from the present coupling composition will typically taper from a relatively wider base nearest to the inner wall of the buffer tube 16 to a relatively narrower end at or near the center of the buffer tube 16 (e.g., typically in contact with the optical fiber element 12). This structure may be observed in raised members 22 that taper uniformly to a point (see, e.g., FIG. 21) or raised members 22 that have a more rounded profile (see, e.g., FIG. 22). In other embodiments, the raised members 22 possess a wide end or overall bulbous profile and taper to a relatively narrow base nearest to the inner wall of the buffer tube 16 (see, e.g., FIG. 23).

In any form, a generally tapering configuration ensures that the force applied to couple the optical fiber element 12 to the buffer tube 16 is appropriate for the size of the optical fiber element 12. In this way, it is easier to deform the narrow ends of the raised members 22 than the thick base, and thus the narrow ends will exert less force. If an optical fiber element 12 is large enough to displace more than just the ends, though, the force needed to deform the raised members 22 (and thus the force exerted by the raised members 22) is greater.

For instance, a small optical fiber element 12 (e.g., a single optical fiber) requires relatively little force to secure it within an optical fiber cable 10, so the relatively small force resulting from the deformation of the narrow tips of the raised members 22 is sufficient to provide the necessary coupling. In contrast, a larger optical fiber element 12 (e.g., a 12×12 ribbon stack) may require more force to secure it within the optical fiber cable 10, and the force initiated by the deformation of wider portions of the raised members 22 is needed to provide the necessary coupling.

Figure 25:
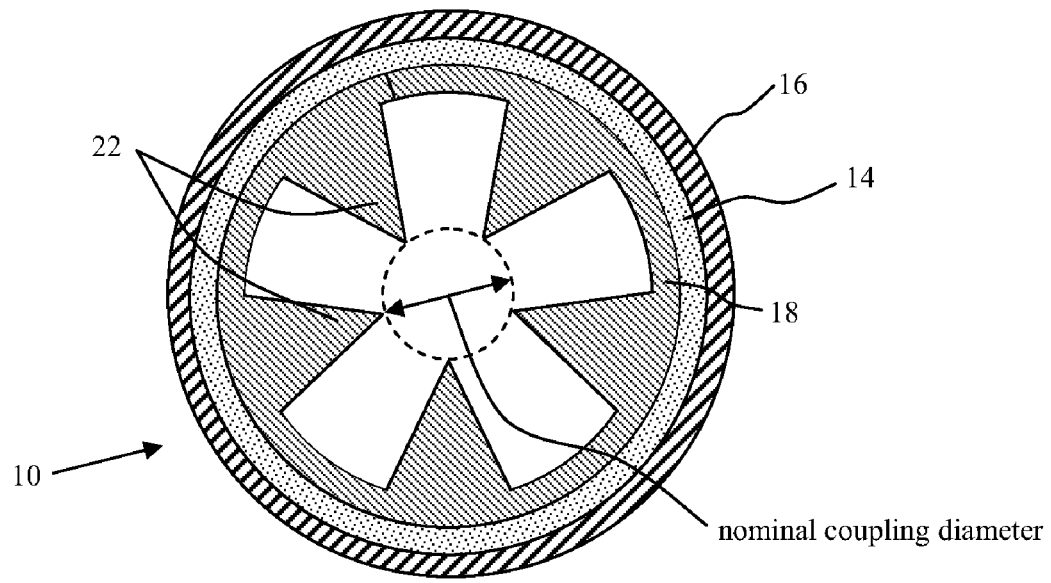
FIGS. 25, 26, 27, and 28 depict cross-sectional views of optical fiber cables that include respective coupling elements formed from the coupling composition according to the present invention. (For clarity, these figures omit the respective optical fiber ribbon stacks.)

In accordance with the foregoing, in one particular optical fiber cable embodiment, an optical fiber cable 10 contains a buffer tube 16 that encloses an optical fiber element 12 with at least one optical fiber (e.g., a single optical fiber, a helical winding of at least two optical fibers, or a ribbon stack). A coupling element 18 formed from the coupling composition is disposed between the optical fiber element 12 and the buffer tube 16. Raised members 22 on the coupling element 18 project inwardly from the coupling element 18 to the optical fiber element 12. (An exemplary coupling element 18 formed from the coupling composition of the present invention is depicted in FIG. 25.)

At a cable cross-section that includes this coupling element 18, one or more of the raised members 22 are in sufficiently forced contact with the optical fiber element 12 to become displaced. The raised members 22 may be laterally displaced, as shown in FIG. 18, or may be otherwise deformed, as shown in FIG. 20. Regardless of the manner in which the coupling element 18 deforms, raised members 22 formed of the novel coupling composition of the present invention will accommodate and secure the optical fiber element 12 within the buffer tube 16.

The interference contact of the two elements restrains the optical fiber element 12 within the buffer tube 16, thereby achieving the desired coupling. It seems that the force applied to the optical fiber element 12 is a result of the coupling composition's tendency to revert to the shape of the coupling element 18. Accordingly, the raised members 22 of the coupling element 18 should not exert such compressive force to cause significant optical attenuation of the optical fiber element 12.

To ensure a greater degree of coupling between the optical fiber element 12 and the buffer tube 16, the coupling element 18 may be configured so that, at any cable cross-section that includes this coupling element 18 (i.e., everywhere along the length of cable), the raised members 22 are in sufficiently forced contact with the optical fiber element 12 to become displaced.

Another particular optical fiber cable embodiment likewise embraces an optical fiber cable 10 containing an optical fiber element 12 enclosed within a buffer tube 16 and a coupling element 18 made of the present coupling composition positioned between the optical fiber element 12 and the buffer tube 16. As with similar optical fiber cable embodiments, raised members 22 formed of the coupling element 18 serve to couple the optical fiber element 12 to the buffer tube 16.

Figure 26:
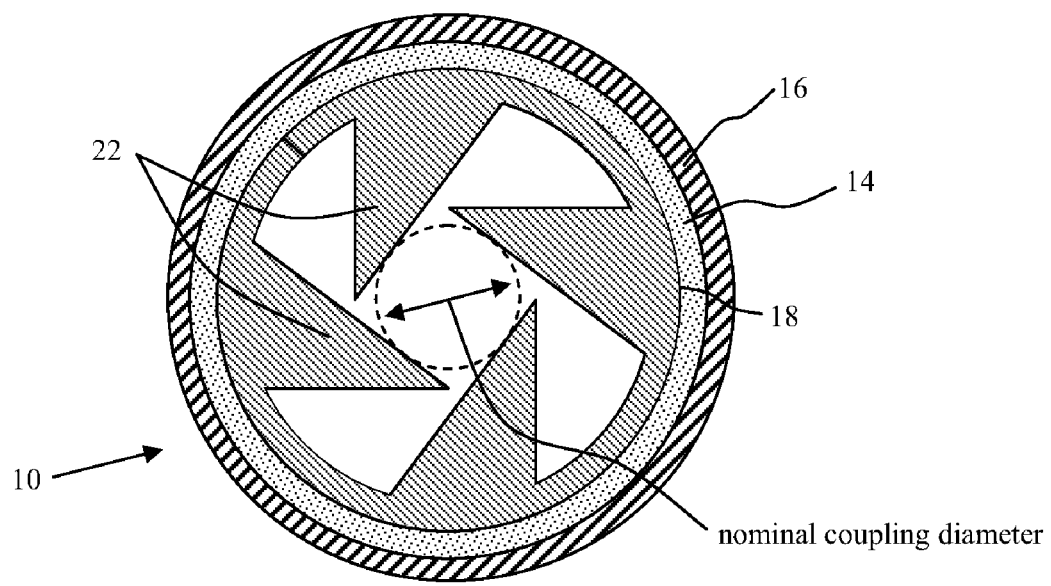

The raised members 22 may project radially inward to contact the optical fiber element 12, or the raised members 22 may project into the buffer tube 16 obliquely (i.e., not directed to the central axis of the buffer tube 16, such as is depicted in FIG. 26) to provide the desired coupling of the buffer tube 16 to the optical fiber element 12. In either configuration, one or more of the raised members 22 are in sufficiently forced contact with the optical fiber element 12 to become deformed, typically laterally displaced.

The coupling element 18 should be configured and sized to require that the raised members 22 of the coupling element 18 contact the optical fiber element 12 at least for some discrete segments along the optical fiber cable 10. In such a configuration, raised members 22 formed of sufficiently elastic materials, such as those compositions described herein, will yield to the optical fiber element 12 but will apply a force resisting the displacement caused by this interference contact (i.e., because of the tendency of coupling element 18 to return to its original shape).

Specifically, at any given cable cross-section that includes the coupling element 18, unless the raised members 22 of the coupling element 18 are sized to physically meet at or near the center of the buffer tube 16, the raised members 22 provide a central free area. At such a cable cross-section, this central free area is the area within the buffer tube 16 in which no raised member 22 can create contact with an optical fiber element 12 positioned within the buffer tube 16. There may be additional free area between adjacent raised members 22, of course, but because optical fiber cable arrangements typically orient the optical fiber element 12 near the center of the optical fiber cable 10, usually only the central free space need be considered when sizing the coupling element 18.

In this regard, the concept of "nominal coupling diameter" is used herein to characterize this non-contact area within the inner region of the optical fiber cable 10 (e.g., within the coupling element 18 and the buffer tube 16).

As discussed with respect to previous optical fiber cable embodiments, the term "nominal coupling diameter" describes, at any given cable cross-section that includes the coupling element 18, the diameter of the largest circular cross-section (i.e., circle) that fits within the central free area defined by the coupling element 18 (and the buffer tube 16 or other surrounding cable components) without touching the coupling element 18. See FIGS. 25 and 26. Furthermore and as used herein, a cable cross-section that does not include (i.e., intersect or otherwise traverse) the coupling element 18 does not define a nominal coupling diameter.

Likewise, the optical fiber element 12 defines a maximum width and a minimum width. As used herein, the term "maximum width" is meant to characterize the largest cross-sectional dimension of the optical fiber element 12. For example, for an optical fiber bundle having a circular cross-section, the maximum width is simply the diameter of the circle it defines. For a rectangular ribbon stack, the maximum width is the measurement of its diagonal. Similarly, the term "minimum width" is meant to characterize the smallest cross-sectional dimension of the optical fiber element 12. For a rectangular ribbon stack, the minimum width is the smallest of either the height or width of the ribbon stack.

In accordance with one particular embodiment of the optical fiber cable 10, at any cross-section of the optical fiber cable 10, the nominal coupling diameter of the coupling element 18 is sized so that it is less than the maximum cross-sectional width of the optical fiber element 12 (e.g., a twisted ribbon stack). In other words, along the length of the optical fiber cable 10, the coupling element 18 is sized such that the optical fiber element 12 can be secured within the buffer tube 16 (and adjacent to the coupling element 18) by the coupling element 18. This configuration can be effective, for example, for securing a twisted ribbon stack within an optical fiber cable 10. As the ribbon stack turns within the buffer tube 16, it will be coupled to the buffer tube 16 wherever its diagonal aligns with the raised members 22 of the coupling element 18.

Alternatively, those having ordinary skill in the art will appreciate that in a particular embodiment of the optical fiber cable 10, at any cross-section of the optical fiber cable 10, the nominal coupling diameter of the coupling element 18 may be sized such that it is approximately equal to the maximum cross-sectional width of the optical fiber element 12. In such configurations, the coupling element 18 is not required to be in interference contact with the optical fiber element 12. Even so, any radial movement of the optical fiber element 12 within the buffer tube 16 is resisted.

This configuration might be effective, for example, for smaller optical fiber elements 12, which require relatively little force to secure them within an optical fiber cable 10. For instance, for securing a small, twisted ribbon stack within an optical fiber cable 10, the ribbon stack, as it turns within the buffer tube 16, will be coupled to the buffer tube 16 wherever a corner of the ribbon stack becomes aligned with the raised members 22 of the coupling element 18.

For example, for an optical fiber bundle having an approximately circular cross-section, the maximum cross-sectional width (i.e., the diameter of the near-circle it defines), will be approximately equal to the nominal coupling diameter of the coupling element 18. For a rectangular ribbon stack, the maximum cross-sectional width (i.e., measured at its diagonal) will approximately equal the nominal coupling diameter of the coupling element 18 (i.e., the four corners defined by the ribbon stack will be in contact with the coupling element 18). Stated otherwise, the raised members 22 of the coupling element 18 will be in contact—albeit light contact—with the optical fiber element 12.

In yet another embodiment, in accordance with FIG. 26, coupling element 18 may be configured to completely surround a substantially rectangular or square optical fiber element 12 (i.e., the four sides of the ribbon stack will align and be in contact with the raised members 22 of the coupling element 18). Those having ordinary skill in the art will appreciate that the configuration of the coupling element 18 (e.g., illustrated in FIG. 26) may be modified to accommodate ribbon stacks of various sizes and shapes (e.g., where the uppermost and lowermost optical fiber ribbons have fewer optical fibers than those toward the center of the ribbon stack).

In accordance with another particular embodiment of the optical fiber cable 10, at one or more cross-sections of the optical fiber cable 10, the nominal coupling diameter of the coupling element 18 is sized so that it is less than the minimum cross-sectional width of the optical fiber element 12. In other words, along the length of the optical fiber cable 10 there is at least one cross-section in which the coupling element 18 is sized such that the optical fiber element 12 must contact the coupling element 18, regardless of how it is oriented within the buffer tube 16.

The coupling element 18 of these particular optical fiber cable embodiments may be sized so that the nominal coupling diameter is significantly less than the minimum width of the optical fiber element 12 (i.e., sized to ensure the elements "overlap"). For instance, a significant difference between the nominal coupling diameter and the minimum width of the optical fiber element 12 (i.e., overlap) might be about ten percent or more. So-called overlaps of about five percent (or even about one percent or less) may be considered significant in some configurations if the amount of interference contact causes substantial deformation of the raised members 22 to secure the optical fiber element 12 within the buffer tube 16. The extent of the overlap between these dimensions (i.e., interference contact) determines the degree of displacement with respect to the raised members 22, which can influence the amount of force applied to restrain the optical fiber element 12. The coupling element 18 may thus be sized such that the nominal coupling diameter is sufficiently less than the minimum width of the optical fiber element 12 so as to require lateral displacement of one or more raised members 22.

Figure 27:
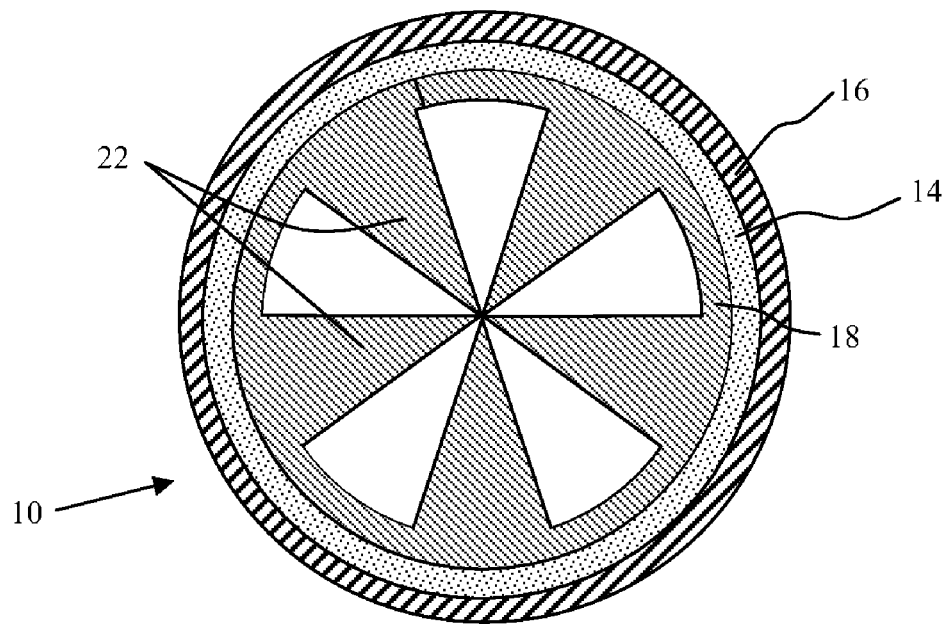
Figure 28:
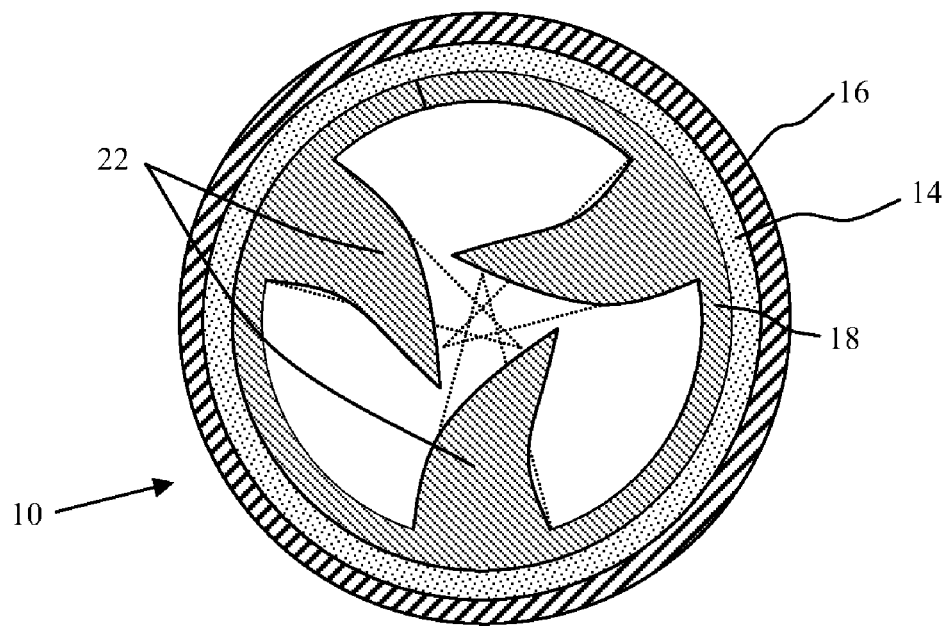

For example, coupling of the optical fiber element 12 within the buffer tube 16 can be effectively assured regardless of the size of the optical fiber element 12 by positioning and/or sizing the coupling element 18 so that the nominal coupling diameter is zero. In other words, the raised members 22 may meet at or near the center of the buffer tube 16, as is depicted in FIG. 27. Alternatively, the raised members 22 may be sized to extend through the center of the buffer tube 16, as is depicted in FIG. 28. In other words, the raised members 22 are sized to overlap each other such that they must deform substantially to accommodate an optical fiber element 12 of any dimension. These exemplary coupling element configurations may be used for supporting very small optical fiber elements 12 or in any instance when a greater degree of coupling is desired.

Those having ordinary skill in the art will appreciate that FIGS. 25, 26, 27, and 28 omit the optical fiber element 12 to better illustrate the sizing of the coupling element 18 in exemplary coupling element configurations.

In yet another particular embodiment of the optical fiber cable 10, an optical fiber element 12 including one or more optical fibers (e.g., a single fiber, multiple fibers twisted together, or a twisted ribbon stack) is positioned within a buffer tube 16. A coupling element 18 formed from the coupling composition according to the present invention is positioned between the optical fiber element 12 and the buffer tube 16. The coupling element 18 includes raised members 22 projecting toward the optical fiber element 12. Specifically, at least one of the raised members 22 tapers inwardly to an end (e.g., to an apex) adjacent to the optical fiber element 12 from a base nearer to the buffer tube 16. Again, the raised members 22 may project radially inward or obliquely toward the optical fiber element 12 so long as they are in sufficiently forced contact with the optical fiber element 12 to become deformed (e.g., bent laterally).

In a variation on this particular optical fiber cable embodiment, at a cable cross-section that includes the coupling element 18, multiple profiles for the raised members 22 are provided. For example, as shown in FIG. 20, relatively longer primary raised members 22 taper inwardly to an apex. Relatively shorter secondary raised members 22 provide support only in instances where the primary raised members 22 cannot sufficiently support the optical fiber element 12, such as during large-scale bending or during substantial thermal contraction of the buffer tube 16 (thereby causing excess length).

In this optical fiber cable embodiment, the relatively longer primary raised members 22 and the relatively shorter secondary raised members 22 may be formed from the same composition or different compositions according to the present invention. See FIG. 20. For instance, the relatively longer primary raised members 22 may possess a higher modulus than do the relatively shorter secondary raised members 22, or the relatively longer primary raised members 22 and the relatively shorter secondary raised members 22 may have differing oil fractions or degrees of foaming, if at all.

As used herein, the term "apex" refers to the end of the raised member 22 that engages or is capable of engaging the optical fiber element 12. See FIGS. 18 and 20. In general, the tip of the apex will typically contact the optical fiber element 12. Those having ordinary skill in the art will appreciate, however, that the lateral deformation of the raised members 22 might be sufficient to direct the tip of the apex away from the optical fiber element 12 (i.e., in a non-contact configuration, such as a J-shape).

Those having ordinary skill in the art will appreciate that the optical fiber cable 10 of the present invention can be viewed as including a central cable core positioned within a buffer tube 16. The core itself contains the optical fiber element 12, which is at least partly positioned within the coupling element 18. In accordance with the present invention, at one or more cross-sections of the optical fiber cable 10, the coupling element 18 defines a nominal coupling diameter that is sufficiently less than the minimum width of the optical fiber element 12 so as to cause the lateral displacement of one or more raised members 22.

The core may further include a water-swellable element 14, which is positioned adjacent to the coupling element 18, typically opposite the optical fiber element 12. The water-swellable element 14 helps to block the ingress of water into the core or, if water intrusion occurs, to impede the flow of water along the length of the optical fiber cable 10.

In any of these particular optical fiber cable embodiments, the coupling element 18 can be formed or otherwise positioned within the buffer tube 16 in various ways. For instance, the coupling element 18 may be an extruded flat tape having a series of longitudinal ribs. These longitudinal ribs serve as the raised members 22, which project from the surface of the tape along its length. The tape can then be shaped into a tube surrounding the optical fiber element 12. This shaping, for instance, may be accomplished by securing the side edges of the coupling element 18 together to form a longitudinally-wrapped tube (i.e., a convolute structure). Alternatively, the tape may be wrapped helically about the optical fiber element 12 to form a tube (i.e., spirally-wound structure).

Moreover, the coupling element 18 may be co-extruded with the buffer tube 16 to not only surround the optical fiber element 12 but also bond the coupling element 18 and the buffer tube 16 together. Similarly, the coupling element 18 may be incorporated into the buffer tube 16 by extruding a buffer tube 16 having raised members 22. In other words, raised members 22 are formed from the present coupling composition directly on the inner wall of the buffer tube 16.

Alternatively, the coupling element 18 may be extruded separately from the buffer tube 16. The buffer tube 16 may then be subsequently formed about the coupling element 18, whose raised members 22 support the optical fiber element 12.

As noted, the coupling element 18 may be secured to the buffer tube 16, whether directly or via connection to another element secured to the buffer tube 16 (e.g., to a water-swellable element 14 bonded to the buffer tube 16). This may be accomplished by inserting an adhesive material (e.g., a thermoplastic or thermoset material) between the coupling element 18 and the adjacent layer. Alternatively, the coupling element 18 may be melt-bonded to the buffer tube 16 during co-extrusion formation of the optical fiber cable 10. In another variation, the coupling element 18 may be frictionally coupled to the buffer tube 16.

A water-swellable element 14 may also be included in the optical fiber cable 10 (e.g., at least partly around the coupling element 18) to help prevent the ingress of water into the core of the optical fiber cable 10 or, if water intrusion occurs, helps to prevent the movement of water along the length of the optical fiber cable 10. Various dry water-blocking materials are known in the art. For example, the water-swellable element 14 may be a water-swellable tape positioned between the inside wall of the buffer tube 16 and the coupling element 18.

Alternatively, the water-swellable element 14 may include water-swellable yarns positioned between the raised members 22 of the coupling element 18. As noted, the configuration uses less water-swellable material to perform the desired water-blocking function. Further, by alternating the water-swellable element 14 and coupling element 18 about the inner surface of the buffer tube 16 rather than stacking the elements on top of each other, thinner buffer tubes may be constructed while retaining significant coupling and water-blocking functions.

In still another variation, the coupling element 18 may itself possess water-blocking characteristics, thereby reducing if not eliminating the need for a separate water-swellable or water-blocking element. For instance (and as discussed previously), the coupling element 18 might be formed from water-swellable materials or a blend thereof (e.g., a blend of water-swellable polymers and non-water-swellable polymers). In this regard, exemplary water-swellable materials include a matrix (e.g., ethylene vinyl acetate or rubber) enhanced with about 30-70 weight percent super absorbent polymers (SAPs), such as particulates of sodium polyacrylate, polyacrylate salt, or acrylic acid polymer with sodium salt. Water-swellable materials can be processed on conventional hot melt adhesive equipment. As before, an exemplary water-swellable material, which can be further blended with non-water-swellable polymeric material to enhance its elasticity, is available from the H.B. Fuller Company under the trade name HYDROLOCK.

Alternatively, the coupling element 18 can be enhanced with water-swellable particulate powders, which can be bound, for instance, to the surface of the coupling element 18, usually opposite the optical fiber element 12 to reduce the risk of optical attenuation (e.g., microbending) or glass degradation. Such powders are typically composed of super absorbent polymers (SAPs) that, when bound on or impregnated in the coupling element 18, are dry to the touch and, accordingly, are readily removed from cables during splicing operations. Furthermore, the water-swellable particulate powders can be applied to the outer surface of the coupling element 18 (i.e., opposite the optical fiber element 12) completely or partially (e.g., intermittently).

Additionally and as noted previously, reinforcing rods, which may be incorporated within the structure of the buffer tube 16, may be included in the optical fiber cable 10 to improve stiffness. Such reinforcing rods may be formed from glass-reinforced plastic (e.g., between about 80 and 90 weight percent glass).

The coupling element 18 may be provided in the optical fiber cable 10 in a number of different configurations. For example, the coupling element 18 may be substantially continuous along the length of the buffer tube 16. A lengthwise-continuous coupling element 18 ensures that coupling can be achieved at any point along the length of the optical fiber cable 10 and that the optical fiber element 12 is sufficiently protected from forced contact with the buffer tube 16 along the length of the buffer tube 16.

Alternatively, the coupling element 18 may be spaced intermittently along the length of the buffer tube 16. The resulting intermittent segments in which the coupling element 18 is present should be spaced closely enough to effectively engage the optical fiber element 12 regardless of how the optical fiber element 12 twists or bends within the buffer tube 16. This configuration reduces the amount of material used to form the coupling element 18 yet maintains sufficient coupling of the optical fiber element 12 to the buffer tube 16.

Figure 29:
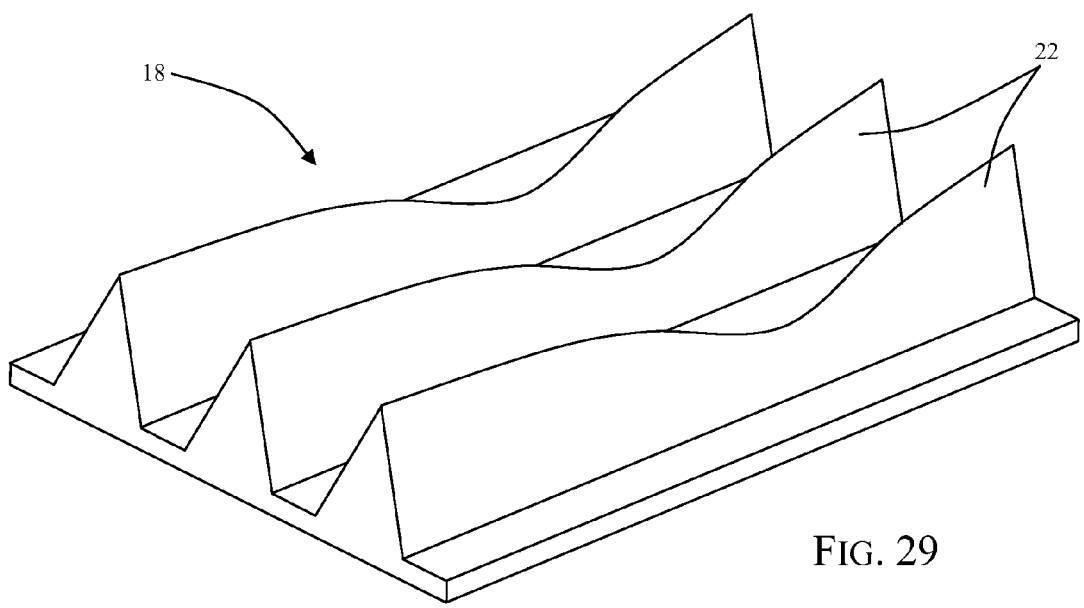
FIG. 29 depicts a perspective view of a coupling element, formed from the coupling composition according to the present invention, having variable height along its length.

Another variation bridges the gap between the lengthwise-continuous and intermittent coupling elements 18. The coupling element 18 of this variation is lengthwise continuous, but the height of the raised members 22 varies along the length of the coupling element 18. See FIG. 29. When the coupling element 18 is inserted or otherwise positioned into a buffer tube 16, it defines varying nominal coupling diameters along its length because of the varying height of the raised members 22. In other words, the nominal coupling diameter is larger where the raised members 22 have a relatively shorter height (i.e., "valleys" in the raised members 22). As a result, this coupling element configuration breaks the connection (i.e., interference contact) between the coupling element 18 and the optical fiber element 12 at certain intervals. These breaks may help provide a place for excess length of the optical fiber element 12 to gather. Additionally, the breaks may release any pressure caused by the twist of the optical fiber element 12, which forces the optical fiber element 12 against the relatively fixed raised members 22.

Those having skill in the art will recognize that these various configurations are effective in providing the necessary coupling both where the coupling element 18 is a separate insert made from the coupling composition and secured to the buffer tube 16 or where it is formed directly on the buffer tube 16 (e.g., deposited segments of the coupling composition).

The coupling element 18 may be provided as a plurality of raised members 22 (e.g., ribs) formed from the coupling composition along the length of the buffer tube 16. The raised members 22 project radially inward from the buffer tube 16 to the optical fiber element 12 to couple the optical fiber element 12 and the buffer tube 16. Except for space considerations, the coupling element 18 is not limited in the number of raised members 22 it may possess but typically includes between one and 16 (e.g., 2-12), more typically fewer than eight (e.g., 3-5). The raised members 22 may be substantially continuous longitudinal ribs formed on the buffer tube 16 substantially parallel to the central longitudinal axis of said buffer tube 16. Alternatively, raised members 22 may wind helically around the optical fiber element 12, thereby distributing the coupling force about the perimeter of the optical fiber element 12 (e.g., an optical fiber bundle). A water-swellable element 14 may also be provided in the buffer tube 16. For example, a water-swellable tape or yarn may be disposed between the raised members 22 (e.g., longitudinal ribs).

In any configuration, the gaps between the raised members 22 should not be so great as to readily permit the optical fiber element 12 to become positioned between the strips and, possibly, to contact the water-swellable element 14 or the buffer tube 16. In other words, the raised members 22 should be positioned about the optical fiber element 12 such that the distance between adjacent raised members 22 is less than the minimum width of the optical fiber element 12.

One or more of the foregoing structural and process embodiments are disclosed in U.S. Provisional Patent Application Ser. No. 60/946,752, for Optical Fiber Cable Having Raised Coupling Supports (filed Jun. 28, 2007) and U.S. patent application Ser. No. 12/146,535, for Optical Fiber Cable Having Raised Coupling Supports (filed Jun. 26, 2008), each of which is hereby incorporated by reference in its entirety.

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. An optical fiber cable, comprising:
an optical fiber element including at least one optical fiber;
a buffer tube enclosing said optical fiber element; and
a coupling element positioned between said optical fiber element and said buffer tube, said coupling element comprising (i) 35 weight percent or less elastomeric block copolymers having a number-average molecular weight of at least about 100,000 g/mol and (ii) at least about 65 weight percent hydrocarbon oil possessing a pour-point of −15° C. or less and a viscosity of 40 centistokes or less at 100° C.;

wherein said coupling element comprises a cohesive gel or a density-reduced foam;

wherein said coupling element at least partially fills the free space between said buffer tube and said optical fiber element.

2. An optical fiber cable according to claim 1, wherein, at a cross-section of said optical fiber cable, said coupling element fills said buffer tube to provide limited contact with said optical fiber element.

3. An optical fiber cable according to claim 1, wherein, at a cross-section of said optical fiber cable, said coupling element substantially fills the free space between said buffer tube and said optical fiber element.

4. An optical fiber cable according to claim 1, wherein, at any cable cross-section that includes said coupling element, said coupling element fills the free space within said buffer tube.

5. An optical fiber cable according to claim 1, wherein said coupling element is intermittently spaced along the length of the optical fiber cable.

6. An optical fiber cable according to claim 1, wherein said coupling element comprises one or more beads.

7. An optical fiber cable according to claim 1, wherein said coupling element comprises between about 5 and 30 weight percent elastomeric block copolymers having a number-average molecular weight of between about 200,000 g/mol and 2,000,000 g/mol.

8. An optical fiber cable according to claim 1, wherein said hydrocarbon oil comprises polyalphaolefinic (PAO) oil having a pour point of −25° C. or less.

9. An optical fiber cable according to claim 1, wherein said coupling element is a homogeneous polymer/oil blend possessing a melt flow temperature of at least about 80° C.

10. An optical fiber cable according to claim 1, wherein said coupling element is a foam having a density reduction of at least 30 percent.

11. An optical fiber cable according to claim 1, comprising a water-swellable element positioned within said buffer tube.

12. An optical fiber cable, comprising:
an optical fiber element including at least one optical fiber;
a buffer tube enclosing said optical fiber element; and
a coupling element positioned between said optical fiber element and said buffer tube, said coupling element comprising (i) 35 weight percent or less elastomeric block copolymers having a number-average molecular weight of at least about 100,000 g/mol and (ii) at least about 65 weight percent hydrocarbon oil possessing a pour-point of −15° C. or less and a viscosity of 40 centistokes or less at 100° C.;
wherein said coupling element comprises a cohesive gel or a density-reduced foam;
wherein, at a cross-section of said optical fiber cable, said coupling element defines a nominal coupling diameter; and
wherein the nominal coupling diameter of said coupling element is greater than the maximum cross-sectional width of said optical fiber element.

13. An optical fiber cable according to claim 12, wherein said optical fiber element is capable of being positioned within said buffer tube in a way that does not require contact with said coupling element.

14. An optical fiber cable according to claim 12, wherein, at any cable cross-section that includes said coupling element, the nominal coupling diameter of said coupling element is greater than the maximum cross-sectional width of said optical fiber element.

15. An optical fiber cable according to claim 12, wherein said coupling element substantially encircles said optical fiber element.

16. An optical fiber cable according to claim 12, wherein said coupling element is substantially continuous along the length of said buffer tube.

17. An optical fiber cable according to claim 12, wherein said coupling element comprises one or more lengthwise-discontinuous beads.

18. An optical fiber cable according to claim 12, wherein said coupling element comprises two or more circumferentially-discontinuous beads positioned adjacent to the optical fiber element.

19. An optical fiber cable according to claim 12, wherein said coupling element comprises a plurality of circumferentially-continuous layers intermittently spaced along the length of the optical fiber cable.

20. An optical fiber cable according to claim 12, wherein said coupling element possesses (i) an elongation to break of at least about 100 percent at about 20° C., (ii) tensile strength of at least about 100 psi at about 20° C., and (iii) Shore A hardness of less than about 25.

21. An optical fiber cable according to claim 12, wherein said coupling element comprises a foam having a density reduction of at least 30 percent.

22. An optical fiber cable, comprising:
a coupling element, said coupling element comprising (i) 35 weight percent or less elastomeric block copolymers having a number-average molecular weight of at least about 100,000 g/mol and (ii) at least about 65 weight percent hydrocarbon oil possessing a pour-point of −15° C. or less and a viscosity of 40 centistokes or less at 100° C.;
wherein said coupling element comprises a cohesive gel or a density-reduced foam;
an optical fiber element at least partially embedded within said coupling element; and
a buffer tube enclosing said optical fiber element and said coupling element such that an annular free space is formed between said coupling element and said buffer tube around the perimeter of said optical fiber element.

23. An optical fiber cable according to claim 22, wherein said optical fiber element is fully embedded within said coupling element.

24. An optical fiber cable according to claim 22, wherein said coupling element possesses (i) an elongation to break of at least about 100 percent at about 20° C., (ii) tensile strength of at least about 100 psi at about 20° C., and (iii) Shore A hardness of less than about 25.

25. An optical fiber cable according to claim 22, wherein said coupling element is a foam having a density reduction of at least 30 percent.

26. An optical fiber cable according to claim 1, wherein said coupling element consists essentially of a cohesive gel.

* * * * *